(12) United States Patent
Kizaki

(10) Patent No.: US 7,460,255 B2
(45) Date of Patent: *Dec. 2, 2008

(54) METHOD, APPARATUS, COMPUTER PRODUCT PROGRAM AND COMPUTER READABLE RECORDING MEDIUM FOR CONFIRMING CONTENTS OF EDITED FILE

(75) Inventor: Osamu Kizaki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 412 days.

This patent is subject to a terminal disclaimer.

(21) Appl. No.: 11/322,352

(22) Filed: Jan. 3, 2006

(65) Prior Publication Data

US 2006/0109494 A1 May 25, 2006

Related U.S. Application Data

(63) Continuation of application No. 09/861,718, filed on May 22, 2001, now Pat. No. 7,023,569.

(30) Foreign Application Priority Data

| May 22, 2000 | (JP) | ............... 2000-150260 |
| Mar. 15, 2001 | (JP) | ............... 2001-074748 |
| Apr. 26, 2001 | (JP) | ............... 2001-129511 |

(51) Int. Cl.
*G06F 15/00* (2006.01)
*G03G 15/00* (2006.01)

(52) U.S. Cl. ............. 358/1.13; 358/1.16; 358/1.17; 358/1.18; 399/82; 399/85

(58) Field of Classification Search ............. 358/1.13, 358/1.16–1.18; 399/76–85
See application file for complete search history.

(56) References Cited

U.S. PATENT DOCUMENTS 5,532,920 A 7/1996 Hartrick et al.

(Continued)

FOREIGN PATENT DOCUMENTS

EP 0 926 586 6/1999

(Continued)

OTHER PUBLICATIONS

U.S. Appl. No. 11/322,352, filed Jan. 3, 2006, Kizaki.

*Primary Examiner*—Edward L. Coles
*Assistant Examiner*—Chan S Park
(74) *Attorney, Agent, or Firm*—Oblon, Spivak, McClelland, Maier & Neustadt, P.C.

(57) ABSTRACT

An image forming apparatus, method, and computer program product, in which image data stored in a file can be printed in two printing modes when a sample printing mode is selected. A first page printing mode is a mode in which only a first page of a selected file is printed. A designated page range printing mode is a mode in which a designated page range of the selected file is printed in order of pages. A mismatch between the number of pages of the selected file and a designated page range is judged. When the mismatch arises, a warning is displayed on a display device of the image forming apparatus to give the warning to an operator.

12 Claims, 34 Drawing Sheets

U.S. PATENT DOCUMENTS

| | | |
|---|---|---|
| 5,615,320 A | 3/1997 | Lavendel |
| 5,764,368 A | 6/1998 | Shibaki et al. |
| 5,798,841 A | 8/1998 | Takahashi |
| 5,923,013 A | 7/1999 | Suzuki et al. |
| 6,122,457 A | 9/2000 | Kizaki |
| 6,134,568 A | 10/2000 | Tonkin |
| 6,163,784 A | 12/2000 | Taguchi |
| 6,633,893 B2 | 10/2003 | Yahara et al. |
| 6,654,136 B2 | 11/2003 | Shimada |
| 6,674,540 B1 | 1/2004 | Wiechers et al. |
| 6,745,229 B1 | 6/2004 | Gobin et al. |
| 6,771,383 B1 | 8/2004 | Ogaki et al. |
| 6,832,010 B2 | 12/2004 | Miyazaki et al. |

FOREIGN PATENT DOCUMENTS

| | | |
|---|---|---|
| JP | 11-27492 | 1/1999 |

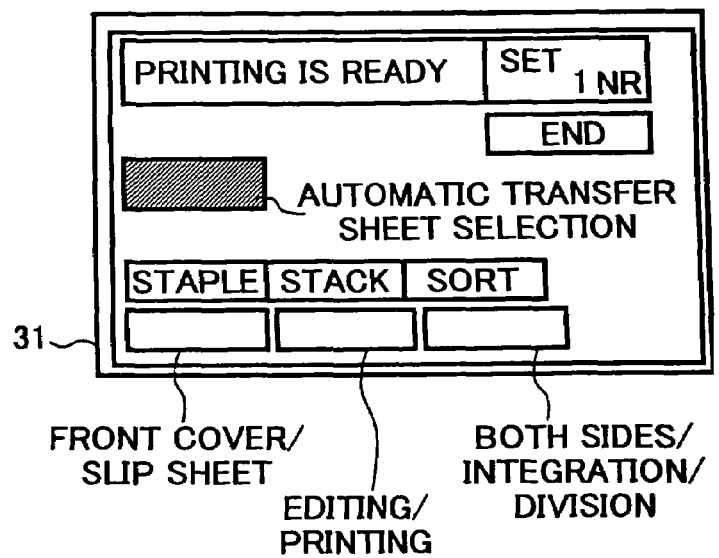

FIG. 34

DESIGNATED PAGE RANGE MISMACHES
WITH FILE PAGE NUMBER.
COUTION SHOULD BE EXERCISED
WHEN CONFIRMING RESULTANT PRINT

| PRINTING ORDER | FILE NAME | PRINTING PAGE RANGE | PRINTING PAGE NUMBER | FILE PAGE NUMBER |
|---|---|---|---|---|
| 1 | FILE A | 2~6 | 5 | 10 |
| 2 | FILE B | 2~3 | 2 | 3 |
| 3 | FILE C | 2~6 | 5 | 17 |
| 4 | FILE D | 2~6 | 5 | 10 |
| 5 | FILE E | 2 | 1 | 2 |

CONFIRM

31

METHOD, APPARATUS, COMPUTER PRODUCT PROGRAM AND COMPUTER READABLE RECORDING MEDIUM FOR CONFIRMING CONTENTS OF EDITED FILE

CROSS-REFERENCE TO RELATED APPLICATIONS

This document is a continuation of a U.S. application Ser. No. 09/861,718, filed May 22, 2001, and claims priority and contains subject matter related to Japanese Patent Application No. 2000-150260, filed on May 22, 2000, Japanese Patent Application No. 2001-74748, filed on Mar. 15, 2001, and Japanese Patent Application No. 2001-129511, filed on Apr. 26, 2001, and the entire contents of each of which are hereby incorporated herein by reference.

BACKGROUND OF THE INVENTION

1. Field of the Invention

The present invention relates to an image forming apparatus, such as a copying machine, a printer, a facsimile, etc., and more particularly, to a method, an apparatus, a computer product program, and a computer readable recording medium for processing stored image data.

2. Discussion of the Background

An image forming apparatus, which stores image information (including text data) and prints it, is commonly known. For example, Japanese Patent Laid-Open Publication No. 11-27492 discloses an image forming apparatus which stores image information input via an image reading unit or a host computer in a memory device. By designating a plurality of files and a printing order, the image forming apparatus processes the designated image data as a series of image groups linked in order of the designation.

As a method for preventing an erroneous copy (i.e., print) in printing a plurality of files in order of setting, a so-called sample printing mode is well-known. In the sample printing mode, whether or not the contents of the files (i.e., image data) are correct is confirmed. In a sample printing mode of a background art, only image data in a first page of each file of a plurality of selected files is output for printing (i.e., a first page printing mode). An outline of contents of each file can be analogically confirmed by this sample printing, which is useful for preventing an erroneous copy (i.e., print).

In recent years, an editing function of a file has been improved with enhancement of functions of an image forming apparatus. A file editing of a plurality of files, such as a deletion of a specific page of a file, an insertion of a file or a page into a specific page, and a merger (i.e., combination) of a plurality of files can be performed. When the above-mentioned various file edits are performed, it is unlikely that a result of the edits can sufficiently be checked by the first page printing mode of the background art.

Therefore, it is necessary for an operator to print all the images of the designated file to check that the file includes the required image data, and to confirm whether or not the file is correctly edited (i.e., the file is edited as required by the operator).

SUMMARY OF THE INVENTION

The present invention has been made in view of the above-mentioned and other problems and addresses the above-discussed and other problems.

The present invention advantageously provides a novel image forming apparatus and method in which contents of a file can be confirmed even after various editing operations are performed.

According to an embodiment of the present invention, an image forming apparatus includes a storage device configured to store input image information. A printer is configured to print the image information stored in the storage device on a recording medium. A management data storage device is configured to handle a cluster of the image information stored in the storage device as a file and store image management data and file management data of the image information. A file selector is configured to select a file to be printed. A printing mode selector is configured to select between a primary printing mode in which all the image information of the file selected by the file selector is printed and a sample printing mode in which a part of the image information of the file selected by the file selector is printed. A page range designating device is configured to designate a range of pages to be printed when the sample printing mode is selected. And, a controller is configured to read image information of a page range designated by the page range designating device in a file selected by the file selector out of image information stored in the storage device based on the management data stored in the management data storage device and to print the read image information by the printer, when a print start instruction is provided with the sample printing mode selected by the printing mode selector and the page range designated by the page range designating device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 shows another exemplary display screen of the liquid crystal touch panel;

FIG. 7 shows another exemplary display screen of the liquid crystal touch panel;

FIG. 34 is an exemplary display screen for giving a warning to an operator when a mismatch arises.

DETAILED DESCRIPTION OF THE PREFERRED EMBODIMENTS

Figure 1:
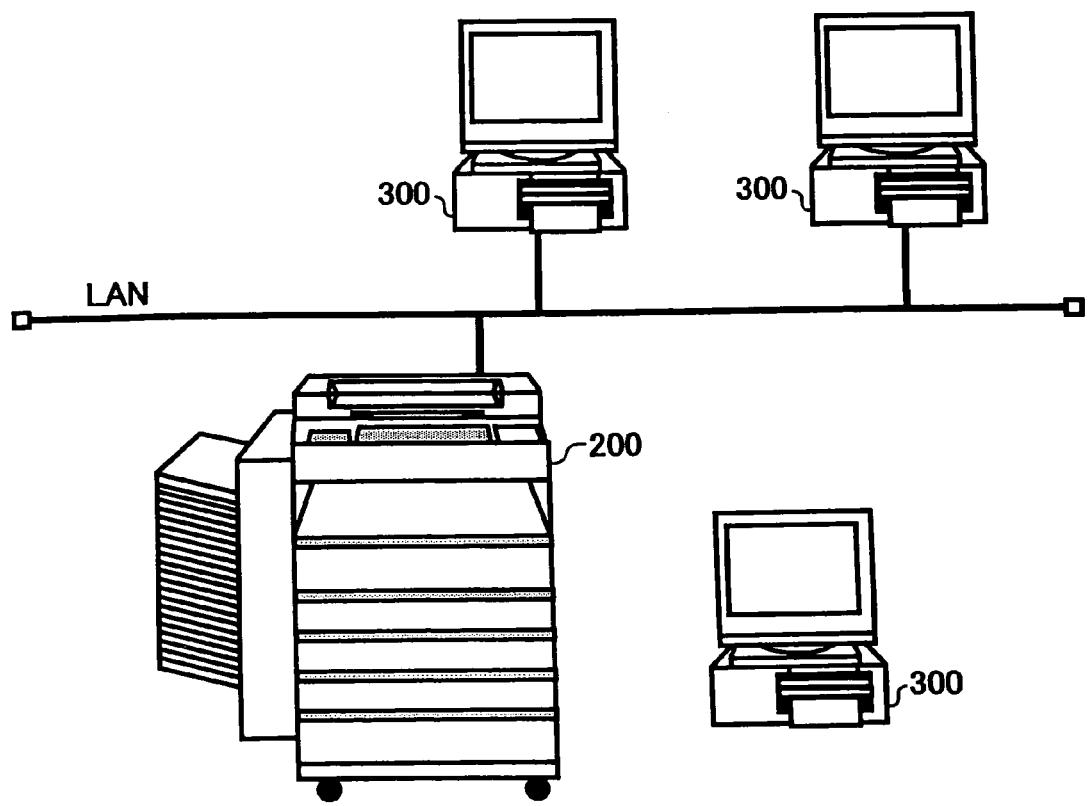
FIG. 1 is a diagram illustrating a whole system in which a digital copying machine, as an example of an image forming apparatus, is connected to a host computer on a local area network (LAN)

Referring now to the drawings, wherein like reference numerals designate identical or corresponding parts throughout the several views, FIG. 1 is a diagram illustrating a whole system in which a digital copying machine, as an example of an image forming apparatus, is connected to a host computer on a LAN (Local-Area Network). A digital copying machine 200 in FIG. 1 is an image forming apparatus that includes scanner and printer functions. The digital copying machine 200 is connected to a host machine 300, such as a personal computer, via a network or a parallel interface, and it can output print data provided from the host machine 300. Of course, the digital copying machine 200 also works as a standalone copier.

Figure 2:
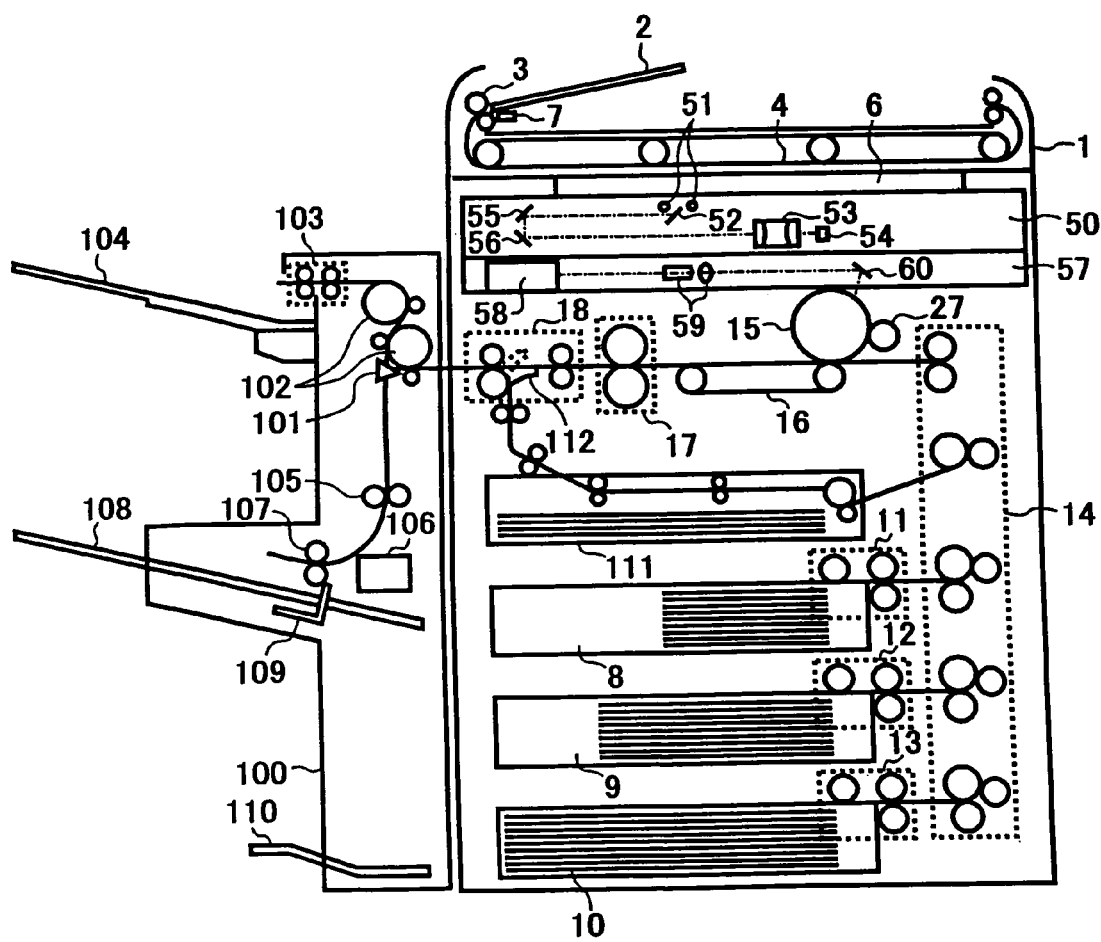
FIG. 2 is a sectional view illustrating an exemplary construction of the digital copying machine.

FIG. 2 is a sectional view illustrating an exemplary construction of the digital copying machine 200. As illustrated in FIG. 2, the digital copying machine 200 includes an automatic original document feeder 1 (hereinafter referred to as an ADF 1) provided at the upper part thereof and a finisher 100 disposed at a side thereof. In this copying machine, a set of original documents placed face up (not shown) on an original document feeding tray 2 of the ADF 1 are fed, sheet-by-sheet starting from the original document placed at the bottom of the set of the original documents, to a predetermined position on a platen 6 by an original document feeding roller 3 and by an original document feeding belt 4, when a start key 34 is depressed (see also FIG. 3). The start key 34 is provided in a below-mentioned operation unit 3. An original document reading unit 50 reads image data of the original document placed on the platen 6. The original document with the image data read is then discharged by the original document feeding belt 4 and by an original document discharging roller 5. When an original document set sensor detects a next original document placed on the original document feeding tray 2, the original document is fed to the predetermined position on the platen 6 in the same manner in which the preceding original document was fed. The original document feeding roller 3, the original document feeding belt 4, and the original document discharging roller 5 are driven by a motor.

A transfer sheet loaded in a first sheet feeding cassette 8, a second sheet feeding cassette 9, or a third sheet feeding cassette 10 is fed by a first sheet feeding unit 11, a second sheet feeding unit 12, or a third sheet feeding unit 13, respectively. The transfer sheet is then conveyed by a vertical sheet conveying unit 14 to a position where the transfer sheet abuts against photoconductive element 15. Image data read by the original document reading unit 50 is written on a surface of the photoconductive element 15 with a laser beam light emitted by a writing unit 57. A toner image is formed on the surface of the photoconductive element 15 with toner by a developing unit 27. Then, the toner image formed on the photoconductive element 15 is transferred onto a transfer sheet, while the transfer paper is conveyed by a sheet conveying belt 16 at the same speed as that of rotation of the photoconductive element 15. The toner image is fixed onto the transfer sheet by a fixing unit 17. The transfer sheet is then discharged to the finisher 100 by a sheet discharging unit 18.

In the finisher 100, the transfer sheet discharged by a discharging roller provided in the main body of the digital copying machine 200 is conveyed either in a direction where a sheet discharging roller 102 is disposed or in a direction where a stapling process is performed. By switching a switching plate 101 in an upward direction, the transfer sheet is discharged to an exit tray 104 via a sheet conveying roller 103. When the switching plate 101 is switched in a downward direction, the transfer sheet is conveyed to a stapler tray 108 via sheet conveying rollers 105 and 107.

A transfer sheet loaded on the stapler tray 108 is jogged by a jogger each time the transfer sheet is discharged to the stapler tray 108. These transfer sheets are then stapled by a stapler 106 when a set of printings is completed. The set of stapled transfer sheets is stored in a stapled-sheet exit tray 110 by its dead weight.

The exit tray 104 is movable back-and-forth. The movable exit tray 104 simply sorts out discharged transfer sheets, by moving back-and-forth, per each original document or per each set of printings sorted by an image memory.

When forming images on both-surfaces of a transfer sheet, the transfer sheet supplied from each of the sheet feeding cassettes 8 through 10 which carries an image on one surface thereof is not conveyed to the finisher 100. This transfer sheet is instead conveyed to a duplex unit 111 to be tentatively stocked there by switching a switching pick 112 in an upward direction. The transfer sheet stocked in the duplex unit 111 is then refed from the duplex unit 111 to have an image, which is formed again on the surface of the photoconductive element 15, transferred on the other-side surface thereof. The transfer sheet having images formed on both-surfaces is conveyed to the finisher 100 by switching the switching pick 112 in a downward direction. As described above, the duplex unit 111 is used when forming images on both-surfaces of a transfer sheet.

A main motor 25 (see FIG. 12) drives the photoconductive element 15, the sheet conveying belt 16, the sheet discharging unit 18, and the developing unit 27. Each of the sheet feeding units 11 though 13 is driven by the main motor 25 via sheet feeding clutches 22 through 24 (see FIG. 12). The vertical sheet conveying unit 14 is driven by the main motor 25 via an intermediate clutch 21 (see FIG. 12).

Constructions and operations of an image reading unit and an image forming section of the digital copying machine 200 are now described below. The original document reading unit (i.e., scanner) 50 includes the platen 6 on which an original document is placed, and an optical scanning system. The optical scanning system includes an exposure lamp 51, a first mirror 52, a lens 53, and a CCD image sensor 54. The exposure lamp 51 and the first mirror 52 are fixed on a first carriage (not shown). A second mirror 55 and a third mirror 56 are fixed on a second carriage (not shown). The first carriage and the second carriage mechanically move at the relative speed of 2:1 (i.e., two to one) to scan an image of an original document so that an optical path length does not change. The optical scanning system is driven by a scanner driving motor (not shown). An image of the original document is read by the CCD image sensor 54. The read image is converted into an electric signal (an analog image signal), and is then converted into digital data (image data). Several image processings are performed on the image data.

The writing unit 57 includes a laser output unit 58, an imaging lens 59, and a mirror 60. The laser output unit 58 internally includes a laser diode which is a laser source, and a polygon mirror which is rotated at a high and constant speed by a motor. Laser beam light emitted from the laser output unit 58 is polarized by the polygon mirror rotating at a constant speed, and passes through the imaging lens 59. The laser beam light is reflected by the mirror 60, and is then converged on a surface of a photoconductive element for forming an image thereon.

The polarized laser beam light is scanned in a direction orthogonal to the rotating direction of the photoconductive element 15 (i.e., in a main scanning direction). Then, a line unit of an image of an image signal output from a selector 64 disposed in a below-mentioned image processing section is recorded. By repeating the scanning in the main scanning direction in a predetermined cycle corresponding to a rotational speed of the photoconductive element 15 and a recording density, an image (electrostatic latent image) is formed on a surface of the photoconductive element 15. As described above, the photoconductive element 15, which constitutes an image forming system, is irradiated with the laser beam light emitted from the writing unit 57. A beam sensor (not shown) generating a main scanning direction synchronizing signal is disposed adjacent to one end of the photoconductive element 15 where the laser beam light is irradiated. Based on the main scanning direction synchronizing signal, a time to start recording an image in a main scanning direction is controlled. A control signal for controlling an input/output of a below-mentioned image signal is generated according to the main scanning direction synchronizing signal.

Figure 3:
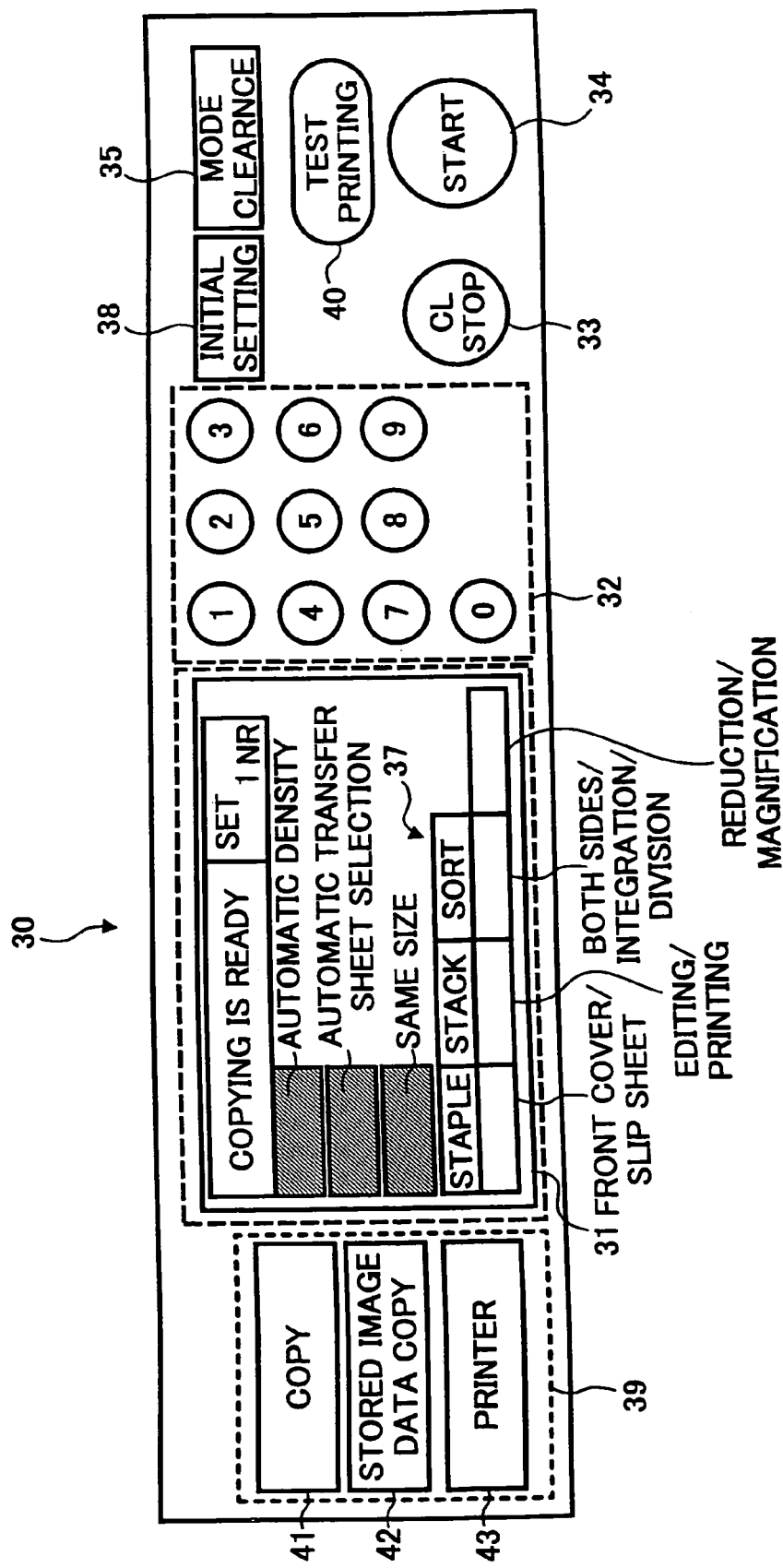
FIG. 3 is a top plan view of an operation unit of the digital copying machine.

FIG. 3 is a top plan view of an operation unit of the image forming apparatus 200. The operation unit 30 includes a liquid crystal touch panel 31, a ten-key pad 32, a clear/stop key 33, a mode clearance key 35, an initial setting key 38, and a test printing key 40. The crystal touch panel 31 includes a function key 37 and displays a message showing the number of printings and a state of the image forming apparatus. The test printing key 40 is provided for printing only 1 sheet irrespective of the set number of printings to confirm a resultant print.

The operation unit 30 further includes a function switching key section 39 in which a copy key 41, a stored image data copy key 42, and a printer key 43 are provided to designate a [copy function], a [stored image data copy function], and a [printer function], respectively.

The copy function controls copying an image read by the scanner 50 onto a transfer sheet via a designated operation. The printer function controls printing an image based on image data and instructions provided by the outside host machine 300 which is connected to the image forming apparatus 200 via a LAN, a parallel I/F, and so forth. The stored image data copy function controls storing an image read by a scanner and image data provided from outside to print the stored image data according to instructions of an operator.

FIGS. 4 through 11 show exemplary displays of the liquid crystal touch panel 31 of the operation unit 30. When an operator touches a key displayed on the liquid crystal touch panel 31, the key indicating the selected function is displayed in reverse. When details of a function must be designated (for example, designation of a value of reduction or magnification), it can be done by touching a key in the liquid crystal touch panel 31. The details of the set function are then displayed on the liquid crystal touch panel 31. Because a dot indicator is used in the liquid crystal touch panel 31, an optimum indication is graphically displayed.

Figure 4:
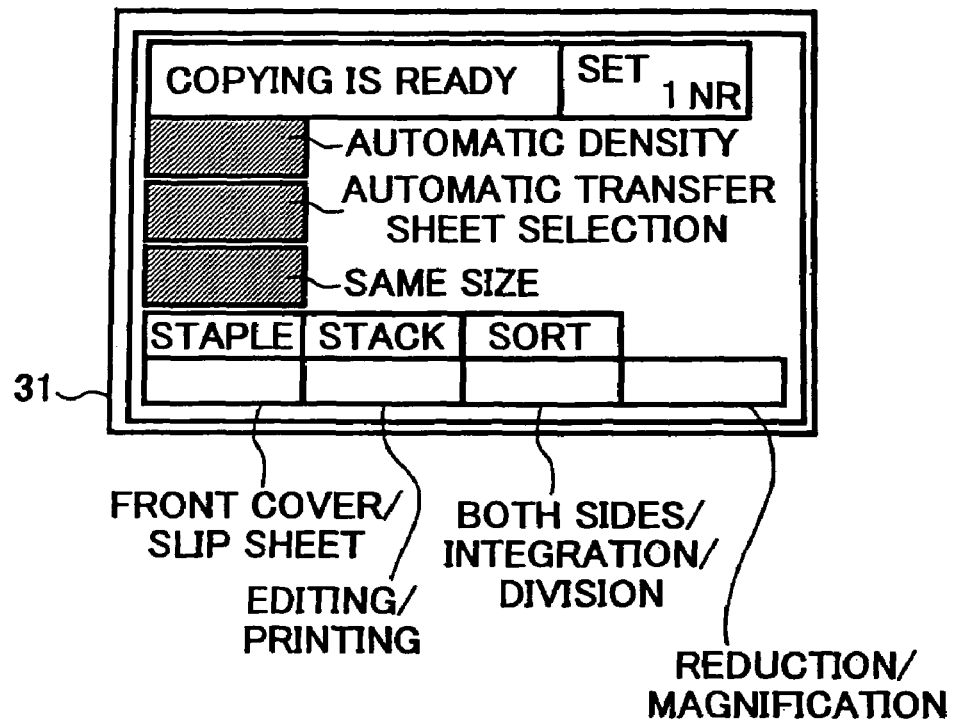
FIG. 4 shows a display screen of a liquid crystal touch panel for setting a copy function.

FIG. 4 shows the display screen of the liquid crystal touch panel 31 for selecting and setting the copy function. A display screen of the liquid crystal touch panel 31 includes a message area in the left upper region thereof where messages, such as "copying is ready", "please wait", and so forth, are displayed, and a copy number indication area at the right hand side of the message area where the set number of printings is displayed.

In the lower region of the message area and the area where the set number of printings is displayed, the display screen of the liquid crystal touch panel 31 further includes an automatic density key, an automatic transfer sheet selection key, a sorting key, a stacking key, a stapling key, a same size printing key, a reduction/magnification printing key, a both sides/integration/division printing key, an editing/printing key, and a front cover/slip sheet key. The automatic density key controls automatically adjusting a density of an image to be printed. The automatic transfer sheet selection key controls automatically selecting a transfer sheet. The sorting key controls designating a sorting of printed transfer sheets in the order of pages. The stacking key controls stacking printed transfer sheets on a page-by-page. The stapling key controls stapling a set of the sorted printed transfer sheets. The same size-printing key controls setting the size of a printing image at the same size while the reduction/magnification printing key controls designating a reduced or an enlarged printing of an image. The both sides/integration/division printing key controls setting a printing mode including a both sides, an integrated, or a divisional printing modes. The editing/printing key controls designating a mode in which a binding margin is secured or printing a stamp, a date, and a page. The front cover/slip sheet key controls inserting a partition in the beginning of images or in the middle of images. In this figure, a key indicating a selected mode is displayed in reverse (i.e., shown via shading).

Figure 5:
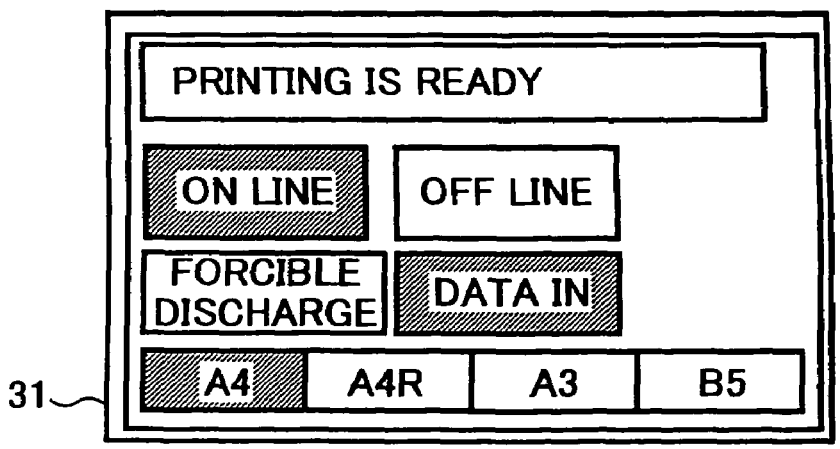
FIG. 5 shows a display screen of the liquid crystal touch panel for operating a printer function.

FIG. 5 shows a display screen of the liquid crystal touch panel 31 for operating the printer function. The display screen displays an on-line/off-line key for setting permission of a printing demand, a compulsory discharging key that forcibly discharges an image, the data of which is input and is not discharged. A data input indication which shows a state of input image data, and an indication of a set situation of a transfer sheet, are also displayed on the display screen.

FIGS. 6 through 11 show display screens of the liquid crystal touch panel 31 for operating the stored image data copy function. FIG. 6 shows a display screen displaying each file list of stored image data when the stored image data copy key 42 shown in FIG. 3 is depressed. A name of a user and file name, a page number, and a registration time of a transferred image are displayed. The displays shown via shading indicate files selected to be output. A number displayed under the heading of "order" shows a printing order of the files. A selection of a file is made by touching a file list displayed on the liquid crystal touch panel 31. The selection of the file can be cancelled by touching the selected file again. More than one file can be selected and the selected files are output in order of selection. A printing key 44 is provided to shift the display screen to that for printing a set file (see FIG. 7). A reading key 46 is provided to shift the display screen to that for storing an image input from a scanner (see FIG. 8). A page printing key 45 is arranged to shift the display screen for printing a selected file (see FIGS. 9 through 11). A cancellation key 47 is arranged to cancel all selected files. Keys labeled with arrows in the directions of upward 48 and downward 49 are provided to scroll hidden files into view, when the number of files for stored image data exceeds the number of files which can be displayed on the screen at one time.

FIG. 7 shows a display screen for outputting stored image data, which is displayed when the printing key 44 (see FIG. 6) is depressed. When an output condition is set, a copying operation is started by depressing the start key 34 (see FIG. 3). When a plurality of files are selected, images are processed as a group of images bundled in the order of selection. Therefore, when a staple mode is set, a stapling operation is performed based on the selected whole images instead of on a basis of each file.

Figure 8:
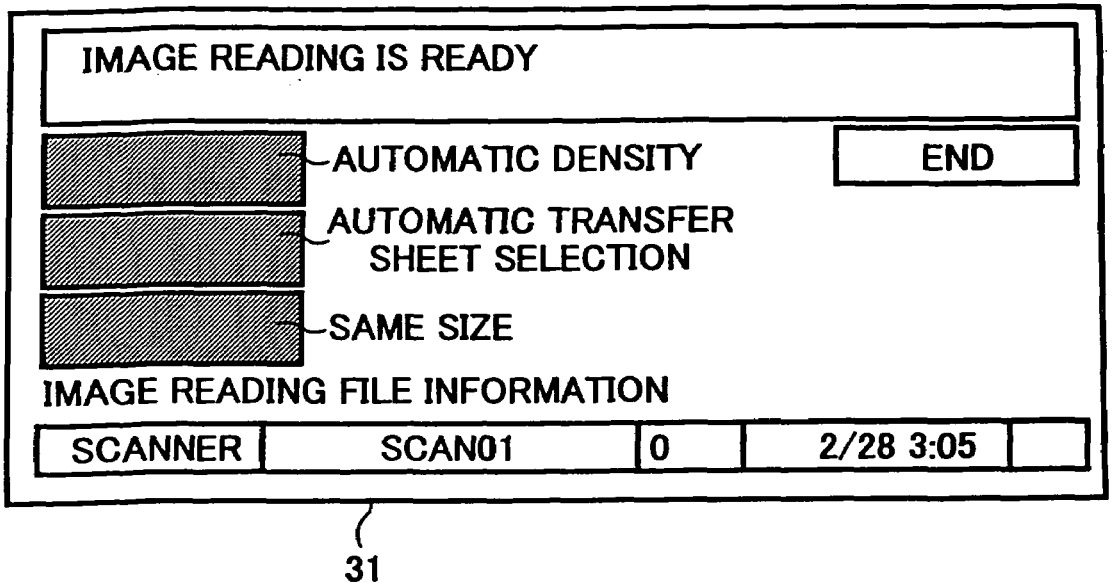
FIG. 8 shows another exemplary display screen of the liquid crystal touch panel.

FIG. 8 shows a display screen of the liquid crystal touch panel 31 for performing a storing operation of an image supplied from a scanner. The screen is displayed when the reading key 46 (see FIG. 6) is depressed. When each mode is set, an image reading operation is performed by depressing the start key 34. A user name and a file name of this file are automatically set as shown in the illustrated example. When there are a plurality of files, each file is uniquely named such that the files are distinguished from each other. The image reading operation ends when an end key 80 is depressed, and the file is closed.

Figure 9:
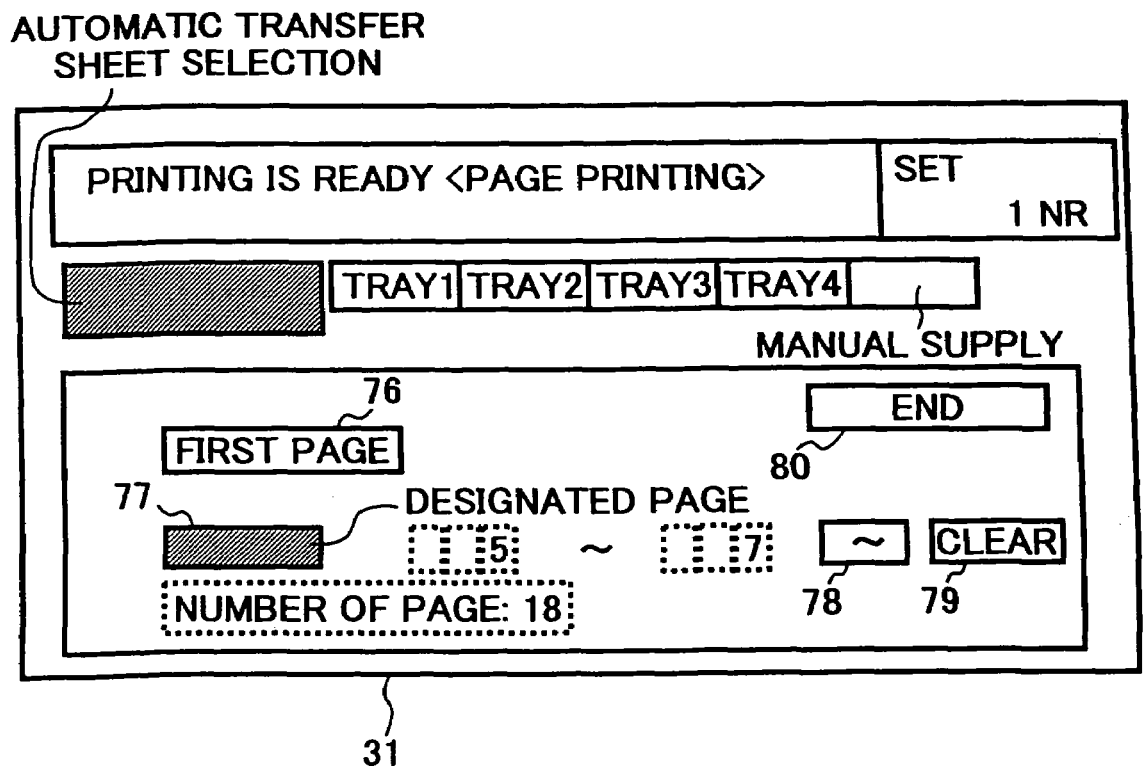
FIG. 9 shows another exemplary display screen of the liquid crystal touch panel.

FIG. 9 shows a display screen to set a page printing mode for a sample printing of an image stored in a file. The screen is displayed when the page printing key 45 (see FIG. 6) is depressed. In a page printing mode, a first page printing mode and a designated page range printing mode can be selected. In the first page printing mode, only a first page of a selected file is printed (when a plurality of files are designated, a first page of each designated file is output in the selected order of the files). In the designated page range printing mode, the designated range of pages of one file (e.g., pages 5 through 7 in FIG. 9) is printed. When a file selection is made on a display screen displaying each file list illustrated in FIG. 6, and a page printing key 45 is depressed, the display screen is shifted to that shown in FIG. 9 when only one file is selected. When a plurality of files are selected, the display screen is shifted to that shown in FIG. 10.

On the display screen in FIG. 9, a first page printing mode key 76 and a designated page printing mode key 77 can be selected. In FIG. 9, the designated page printing mode is set and the printing page range is input with the starting page and the ending page. The total number of pages of selected files is displayed below the designated page printing mode key 77 (e.g., 18 pages in an example shown in FIG. 9) to warn an operator of a maximum value of a page range. A designated page can be input by depressing the designated page printing mode key 77 first of all, and then a starting page is input by using the ten-key pad 32 (see FIG. 3). When an ending page is input, a page range designating key 78 labeled with [~] is depressed, which puts the apparatus into an ending page input mode. The ending page is then input by using the ten-key pad 32. When a designated page is not correctly input, a clear key 79 is depressed which puts the apparatus into a state in which the designated page printing mode key 77 is depressed. Then, a correct starting page can be input again.

Figure 10:
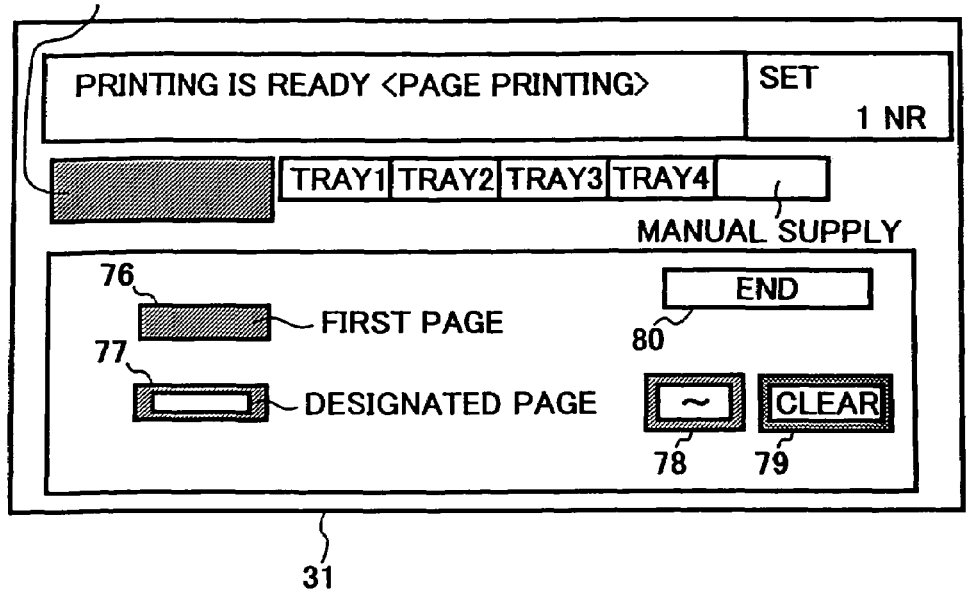
FIG. 10 shows another exemplary display screen of the liquid crystal touch panel.

In FIG. 10, the designated page printing mode key 77, the [~] key 78, and the clear key 79 are masked such that these keys cannot be selected because a plurality of files are selected.

Figure 11:
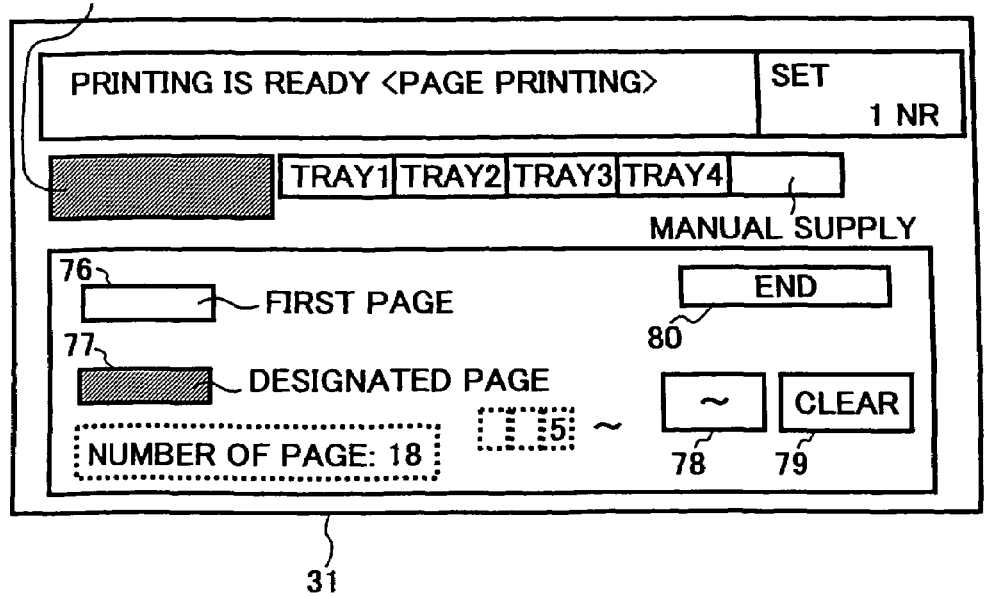
FIG. 11 shows another exemplary display screen of the liquid crystal touch panel.

FIG. 11 shows a state in which the designated page printing mode key 77 is depressed and only a starting page is input. Generally, a starting page and an ending page are input at the same time. For example, when only the 5th page of a file is printed, usually [5] is input as the starting page, and then [5] is input as the ending page after the [~] key 78 is depressed. However, the 5th page of the file alone can be printed by depressing the start key 34 after inputting the starting page alone without inputting the ending page as shown in FIG. 11.

Figure 12:
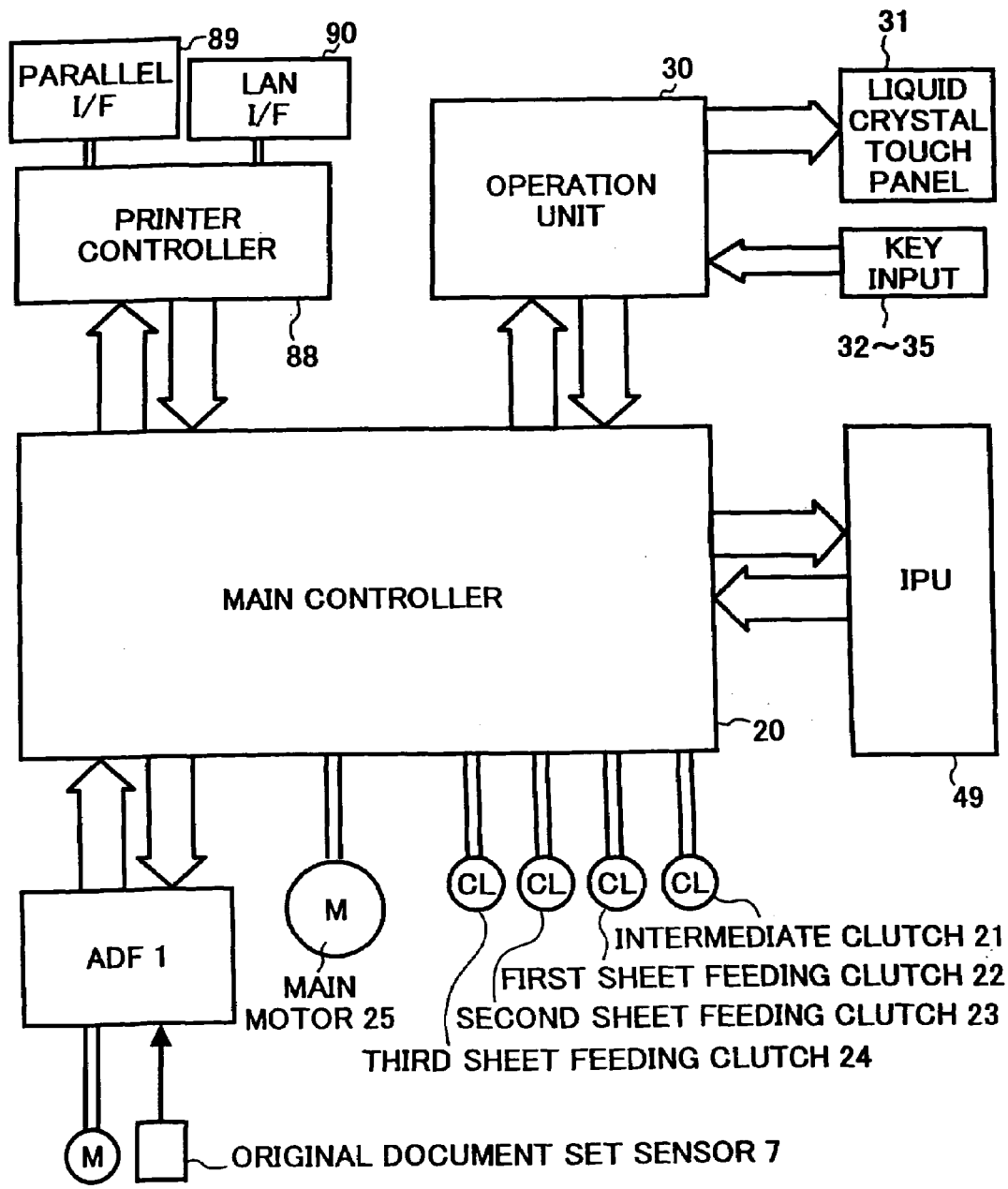
FIG. 12 is a block diagram illustrating an outline of an electric system of the digital copying machine in FIG. 2.
Figure 13:
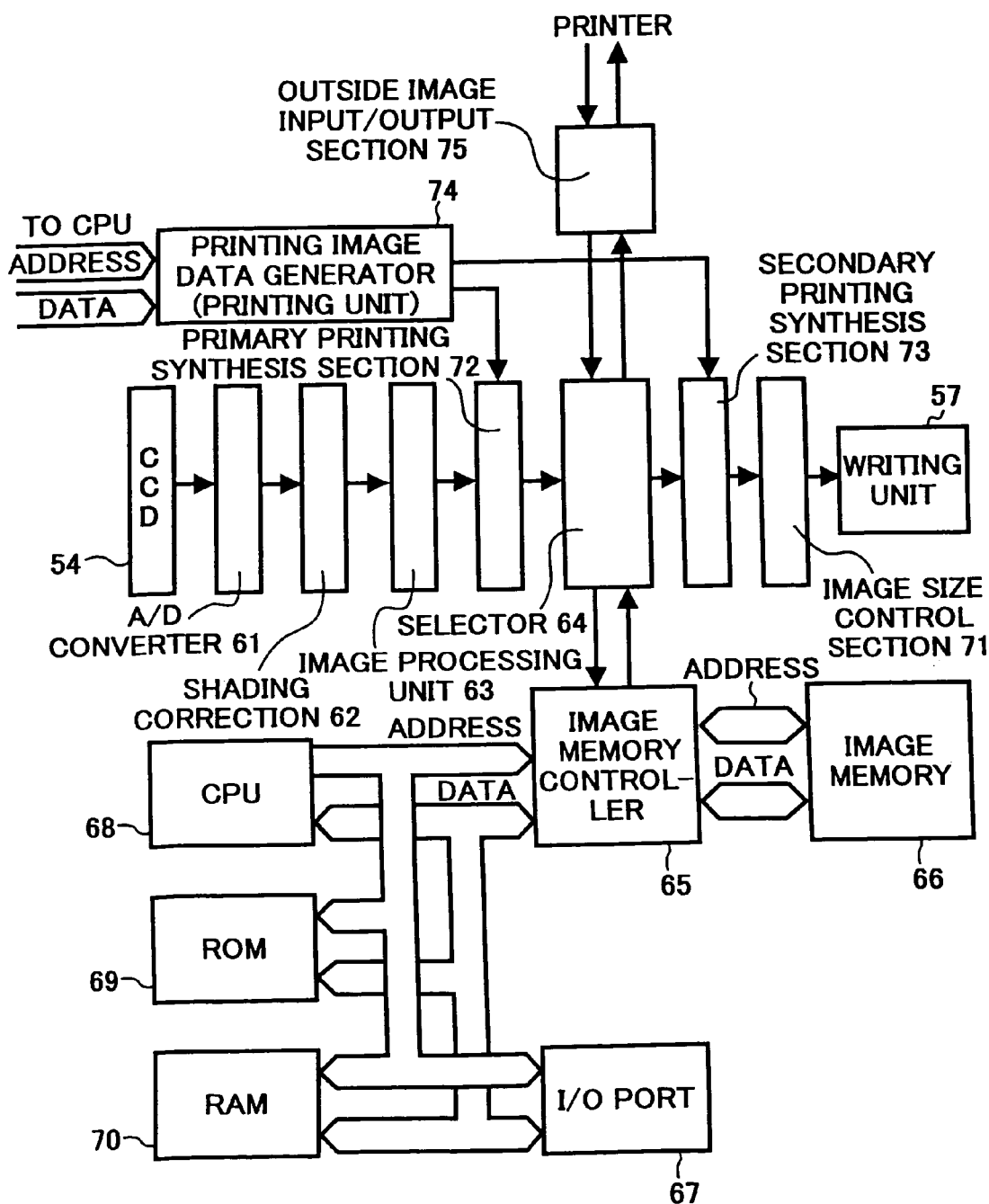
FIG. 13 is a block diagram illustrating exemplary constructions of an image reading unit and an image writing unit.

FIG. 12 is a block diagram illustrating an outline of an electric system of the image forming apparatus 200. FIG. 13 is a block diagram illustrating details of a part of the electric system of the image forming apparatus 200. FIG. 12 illustrates controlling units of the image forming apparatus 200 centering on a main controller 20.

Referring to FIG. 12, the main controller 20 controls a whole system of the image forming apparatus 200. The main controller 20 is connected to decentralized control units, such as the operation unit 30, an IPU (i.e., image processing unit) 49, and the ADF 1. The operation unit 30 displays information for an operator and controls inputs from the operator for setting functions. The IPU 49 controls the scanner, a writing operation of an original image into an image memory, and also controls a forming operation of an image stored in the image memory. The main controller 20 communicates with each of the decentralized control units for exchanging information about a state of the apparatus and an operating command as necessary. Additionally, the main motor 25 used for conveying a transfer sheet, and various kinds of clutches 21 through 24, is connected to a driver (not shown) of the main controller 20.

A printer controller 88 analyzes an image and a print instructing command supplied from the outside to bitmap the image as image data to be printed and to determine a printing operation by analyzing a printing mode from the command. A LAN·I/F section 90 and a parallel I/F section 89 receive the image and the command via the LAN and the parallel I/F.

Referring to FIG. 13, exemplary constructions of a scanner and a printer (i.e., an image reading unit and image writing unit) of the image forming apparatus 200 are now described below. FIG. 13 also illustrates a configuration of the main controller 20 (see FIG. 12).

Beam light emitted from the exposure lamp 51 (shown in FIG. 2) irradiates a surface of an original document. The beam light reflected from the surface of the original document is led to the lens 53 (shown in FIG. 2) to form a focused image on the CCD image sensor 54. An analog image signal generated by the CCD image sensor is converted into a digital signal by an A/D (analog/digital) converter 61. After a shading correction 62 on the image signal converted into the digital signal is carried out, a MTF correction and a γ correction are performed by an image processing section 63. The selector 64 switches a destination of the image signal between an image size control section 71 and an image memory controller 65. The selector 64 is configured to exchange image signals with external apparatuses, such as a printer, via an outside image input/output section 75.

When an image is combined with image data, image data generated by a printing image data generator (printing unit) 74 is combined with the above-described image signals by a primary printing synthesis section 72 or a secondary printing synthesis section 73. The printing image data generator 74 is connected to a CPU bus and generates a character image for a page printing, i.e. an arbitrary image for a stamp. Image data generated by the printing image data generator 74 is input to the primary printing synthesis section 72 and the secondary printing synthesis section 73 to combine an arbitrary image with image data of an original document or image data stored in the image memory 66. The printing image data generator 74 not only generates printing image data but also sets a position where the generated image data is combined.

An image signal provided to the image size control section 71 is reduced or enlarged therein according to a designated rate of reduction or magnification, and is then provided to the writing unit 57. The image memory controller 65 and the selector 64 are configured to input and output an image signal bidirectionally between them. Though not specified in FIG. 13, the image processing unit (IPU) 49 includes a function that selects an input/output of a plurality of data. Thereby the image processing unit 49 can process image data supplied from the outside (for example, data output from a data processing apparatus, such as a personal computer) in addition to image data input from the original document reading unit 50.

A lower half part of FIG. 13 illustrates an internal construction of the main controller 20 (shown in FIG. 12). The main controller 20 includes a CPU 68, a ROM 69, a RAM 70, the image memory controller 65, the image memory 66, and an I/O port 67.

The CPU 68 sets the image memory controller 65 and controls the original document reading unit 50 and the writing unit 57. The ROM 69 and the RAM 70 store programs and data. In addition, the CPU 68 carries out a writing and readout of data of the image memory 66 through the memory controller 65. The I/O port 67 is connected to the CPU 68, the ROM 69, the RAM 70, and the image memory controller 65 via an address bus and data bus so that a drive unit or a device to read a recording medium (not shown) can be connected via the I/O port 67.

Figure 14:
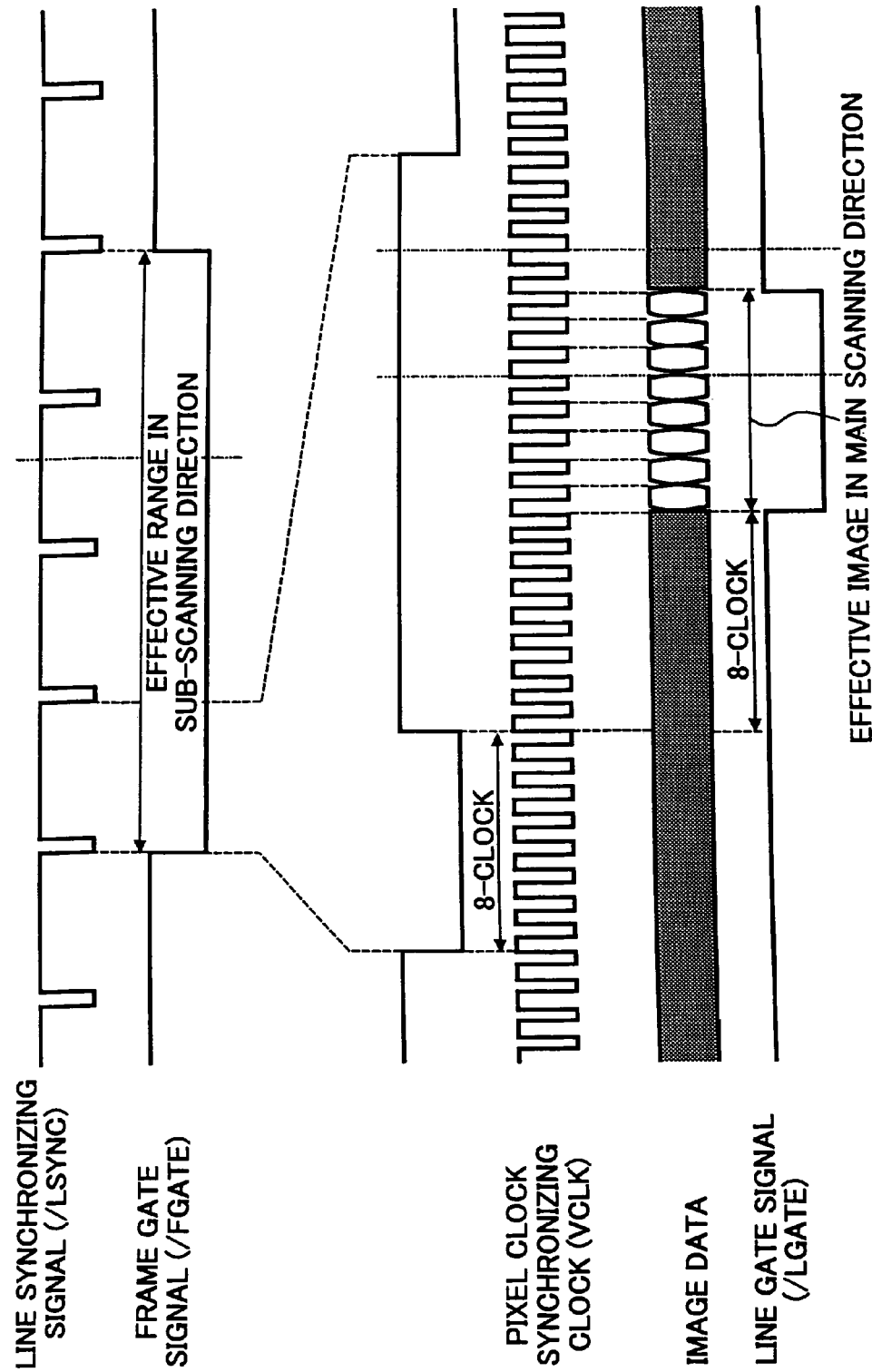
FIG. 14 is a timing diagram illustrating correlation between image data output by a selector in FIG. 13 (i.e., effective image data in a main scanning direction) and timing signals.

Referring to FIG. 14, synchronizing signals of image data are now described below. A frame gate signal: /FGATE (a forward slash mark "/" means an overline of the FGATE) indicates an effective time period of image data of one page in a sub-scanning direction. A line synchronizing signal (/LSYNC) is a synchronizing signal for each one line of image data in a main scanning direction. Image data becomes effective after the /LSYNC rises and a predetermined number of clock signals are generated. The /LGATE signal indicates that the image data is effective in the main scanning direction. These signals synchronize to a pixel clock (i.e., VCLK), and one pixel of image data is output for one cycle of the VCLK. The IPU 49 (shown in FIG. 12) is configured to generate /FGATE, /LSYNC, /LGATE, and VCLK for each image input and output. Thus, a combination of a various image input/output is implemented.

Figure 15:
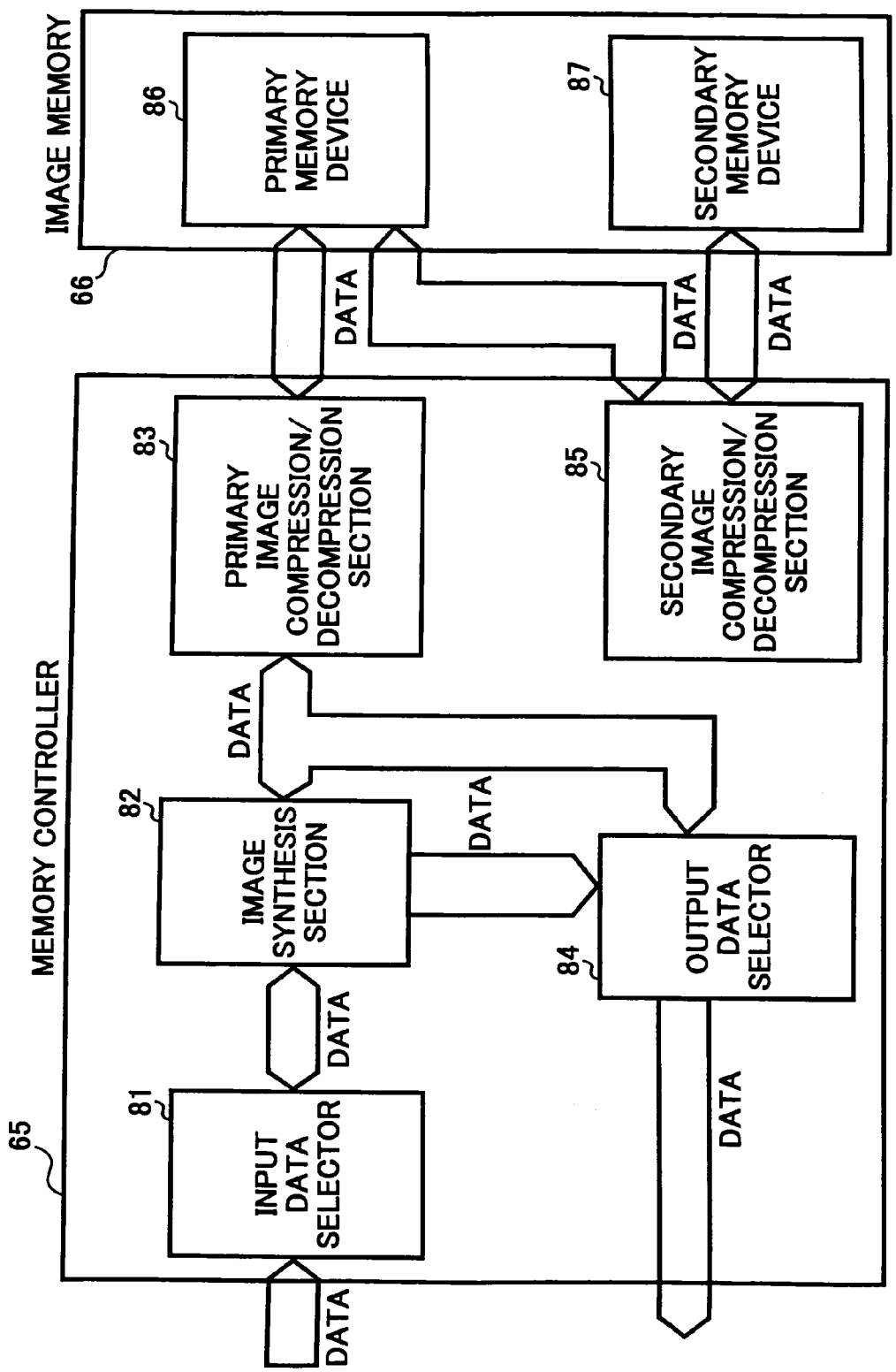
FIG. 15 is a block diagram illustrating exemplary constructions of an image memory controller and an image memory in FIG. 13.

FIG. 15 is a block diagram illustrating exemplary constructions of the image memory controller 65 and the image memory 66 in FIG. 13. The image memory controller 65 includes an input data selector 81, an image synthesis section 82, a primary image compression/decompression section 83, an output data selector 84, and a secondary compression/decompression section 85 as a block. A setting of control data to each block is performed by the CPU 68. "DATA" shown in FIG. 15 indicates an image data bus in which image data flows. An address data bus connected to the CPU 68 is not illustrated in FIG. 15.

The image memory 66 includes a primary memory device 86 and a secondary memory device 87. As for the primary memory device 86, a fast accessible memory, such as a DRAM, is used so that a writing operation of data into a memory or a reading operation of data from the memory when an image is input is performed at a high speed. The writing operation of the data into the memory is performed approximately in synchronization with a transfer speed of input image data. Further, the primary memory device 86 includes an interface section with the image memory controller 65. The interface section is configured such that input and output operations are simultaneously performed by dividing image data into a plurality of areas according to a size of the image data. The primary memory device 86 is connected to the interface section of the image memory controller 65 with two sets of address data lines for a reading operation and for a writing operation so that an input of image data into each of the divided areas (e.g. areas 1 and 2) and an output of the image data from each of the divided areas are carried out in parallel. Thereby, an outputting operation (i.e., reading) of an image from the area 2 can be performed, while an inputting operation (i.e., writing) of an image into the area 1 is performed.

The secondary memory device 87 has a large memory capacity so that it can store image data to produce a combined image of input images or to sort out the input images. When a fast accessible element is used for both the primary and the secondary memory devices 86 and 87, data processing is performed irrespective of the primary and the secondary memory devices 86 and 87, resulting in ease of control. However, because an element, such as the DRAM etc., is expensive, a large-capacity recording medium with a comparatively low access speed may be used as the secondary memory device 87. Thus, processing of input and output data is performed via the primary memory device 86.

With the image memory 66 configured as described above, an image forming apparatus, in which processing of a large amount of data, such as an input/output, a storage, and a manipulation of data is performed, can be provided with a comparatively simple construction and at a relatively low cost.

Next, an operation of the image memory controller 65 is now explained below.

An image input (i.e., writing to the image memory 66). The image data selector 81 selects image data to be written into the image memory 66 (i.e., the primary memory device 86) among a plurality of image data. The image data selected by the input data selector 81 is supplied to the image synthesis section 82 in which the image data is combined with image data which has been stored in the image memory 66.

The image data processed by the image synthesis section 82 is compressed by the primary image compression/decompression section 83. The image data is then written into the primary memory device 86. The image data written into the primary memory device 86 is further compressed as necessary by the secondary compression/decompression section 85. The image data is then stored in the secondary memory device 87.

An image output (i.e., readout from the image memory 66). When an image is output, image data stored in the primary memory device 86 is read out. When image data to be output has been stored in the primary memory device 86, the image data is decompressed by the primary image compression/decompression section 83. The output data selector 84 selects the decompressed image data or data created by combining the decompressed image data and an input image data, and outputs the selected data.

The image synthesis section 82 performs processing, such as a combination of image data stored in the primary memory device 86 and input image data (i.e., it has a phase adjustment function of image data), and a selection of a destination of the combined image data (i.e., an image output or a write back to the primary memory device 86 is performed, or the image output and the write back to the primary memory device 86 can simultaneously be performed).

When image data to be output has not been stored in the primary memory device 86, the image data that has been stored in the secondary memory device 87 is decompressed by the secondary compression/decompression section 85. Then, the above-described image output operation is performed after the decompressed image data is written into the primary memory device 86.

Figure 16:
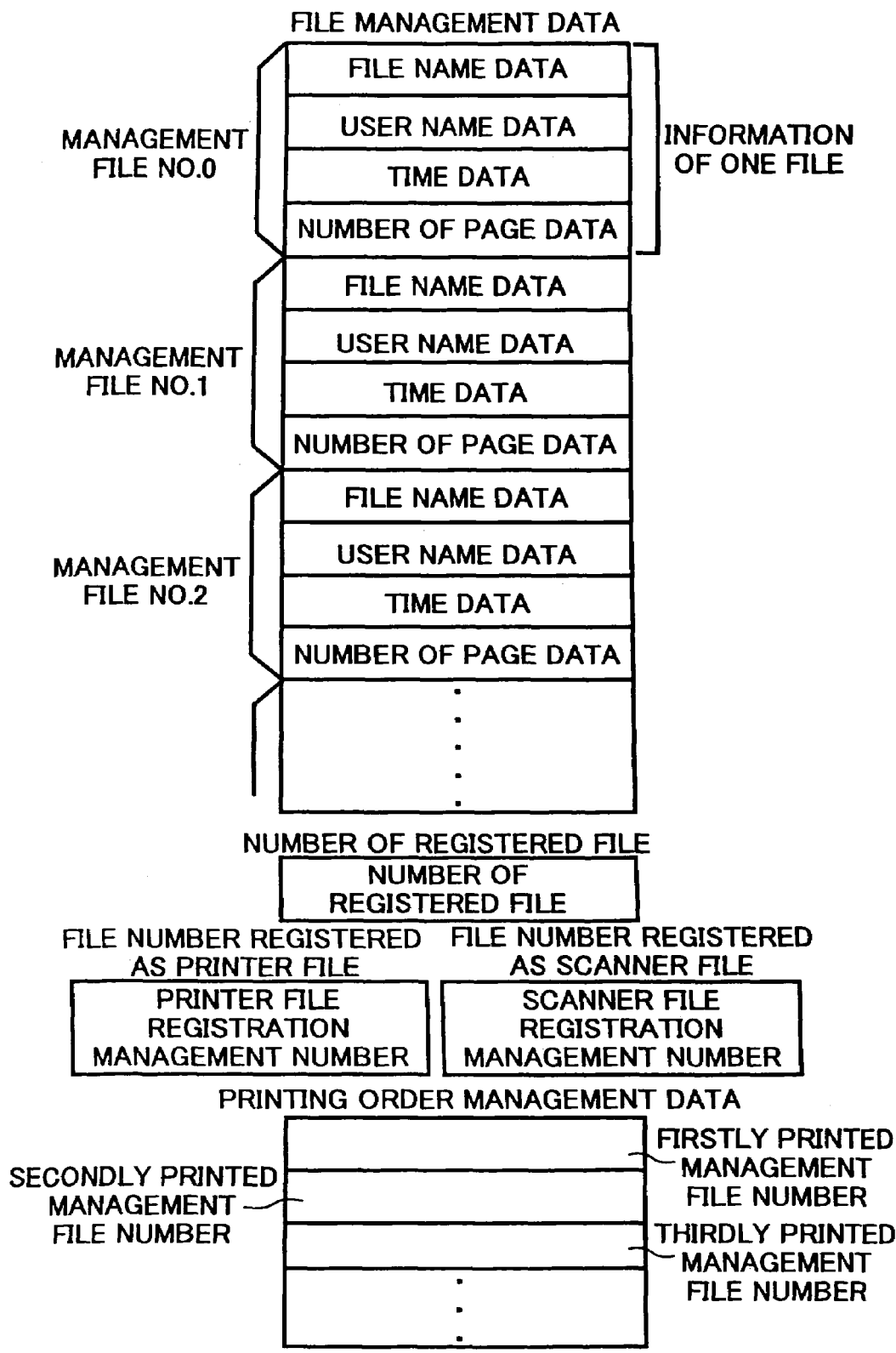
FIG. 16 is a schematic drawing illustrating a construction of file management data for a file storage registration and management.

FIG. 16 is a schematic drawing illustrating a construction of management data used for a file storage registration and file management. File name data, user name data, storage time data, and data on the number of pages are controlled on a file-by-file basis as file control data. These data are arranged in a block. A new file is registered below these blocks, and the number of a registered file is then incremented. When filed data is deleted, data filed next to it is brought forward. The number of the registered file is then decremented. The registration file number indicates the number of registered files.

A file registered as a printer file is given a printer file registration management number. The printer file registration management number is used for identifying the file in management files. A scanner file registration management number is given to a file registered as a scanner file.

A management file number is arranged in the order of printing as printing order management data. When the management file number is not given, "−1" (byte width data of FFH) is given. Files arranged from the top to the file bearing the management file number of "−1" are identified as a series of files to be printed, when printing. Image data stored in both a printer file and a scanner file can be set as printing order management data.

An image to be stored in a memory is designated by controlling an image number with data of 2 bytes including one higher-column byte for controlling a file number and one lower-column byte for controlling the number of pages (i.e., from page 0 to the designated page). Access to a memory unit is controlled by this image number. Therefore, in the case the management file number is 2 and the number of pages are 5, the below-described image number is given from the front. That is, 512(0200H), 513(0201H), 514(0202H), 515(0203H), and 516(0204H).

When a plurality of files are printed at the same time, a memory number is determined by a management file number and the number of pages in order of printing order management data. The number of pages controlled by the printing order management data is printed as a group of images.

Figure 17:
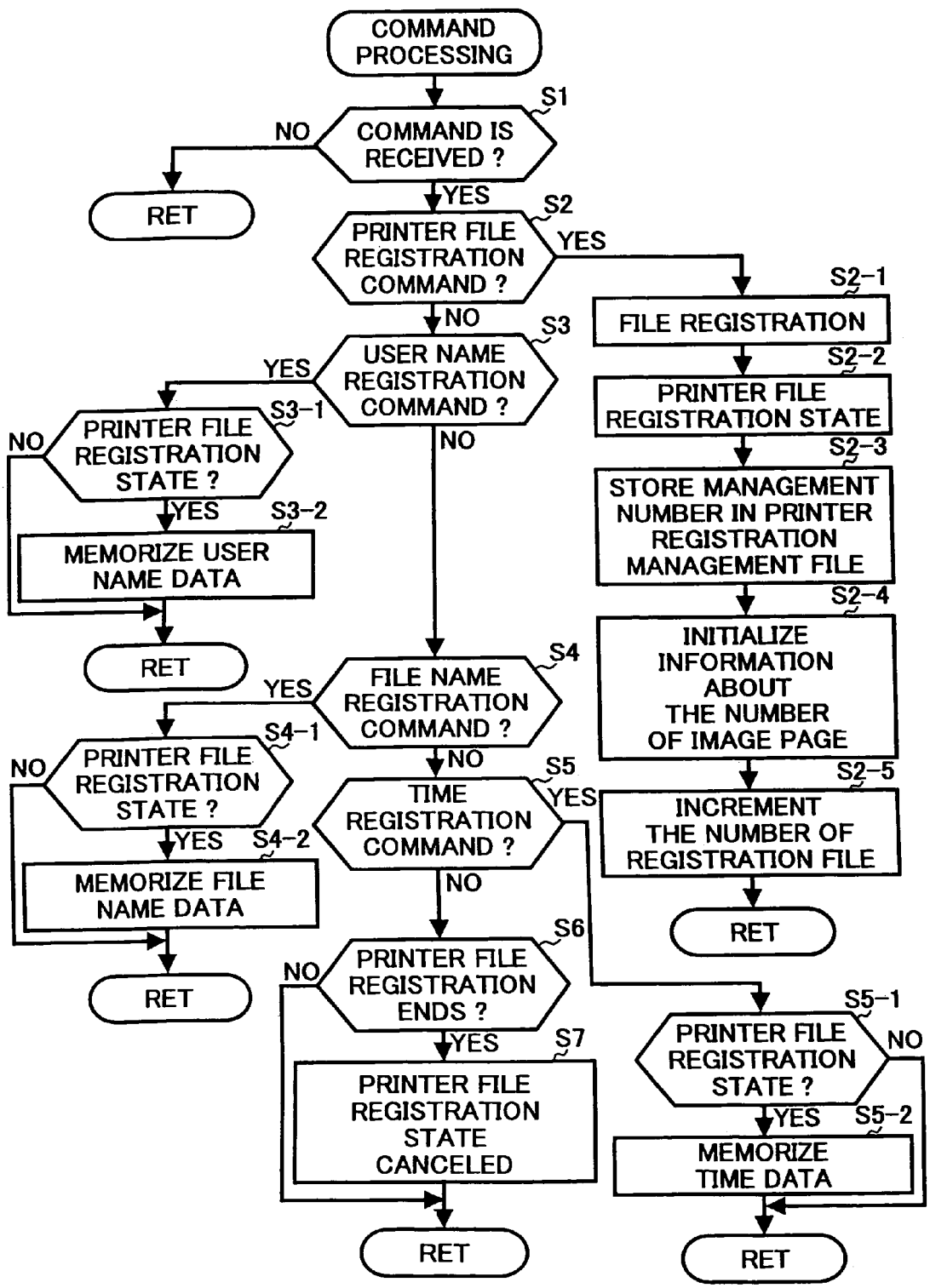
FIG. 17 is a flowchart illustrating a command process.

Next, processing functions of the CPU 68 (shown in FIG. 13) are now explained below. FIG. 17 is a flowchart illustrating processing (i.e., a command processing) performed by the CPU 68 in response to a command from a host machine, such as a print demand. Whether a command is received or not is judged at step S1 (hereinafter referred to simply as S1). At S2, whether or not the received command is a printer file registration command is determined. When the command is for registrating in a printer file, Yes in S2, a file region for storing data as file management data is secured at S2-1. The apparatus becomes a printer file registration state at S2-2. A management file number obtained at S2-1 is memorized as a printer registration management file number at S2-3. The file management data is registered in the order of each file block. The printer file registration state means the state in which an image supplied from a printer I/F is stored. Then, the number of pages corresponding to the file management data is initialized (i.e., cleared with "0") at S2-4. The registration file number is then incremented at S2-5.

When the CPU 68 receives a user name registration command at S3, i.e. Yes at S3, whether or not the apparatus is in the printer file registration state is confirmed at S3-1. When it is confirmed that the apparatus is in the printer file registration state, Yes at S3-1, the user name is memorized as user name data corresponding to file management data at S3-2. When the apparatus is not in the printer file registration state, No at S3-1, the command is disregarded as an invalid command.

Further, when the CPU 68 receives a file name registration command at S4, it is confirmed whether or not the apparatus is in the printer file registration state at S4-1. The file name is memorized at S4-2 when it is in the printer file registration state, i.e. when Yes at S4-1. When the apparatus is not in the printer file registration state, No at S4-1, the command is disregarded as an invalid command.

When the CPU 68 receives a time registration command at S5, whether or not the apparatus is in the printer file registration state is determined at S5-1. The time is memorized when it is in the printer file registration state at S5-2, i.e. when Yes at S5-1. When the apparatus is not in the printer file registration state, No at S5-1, the command is disregarded as an invalid command.

The printer file registration state is canceled at S7, when the CPU 68 receives a printer file registration end command at S-6. The registration on this file ends by this registration releasing command.

Figure 18:
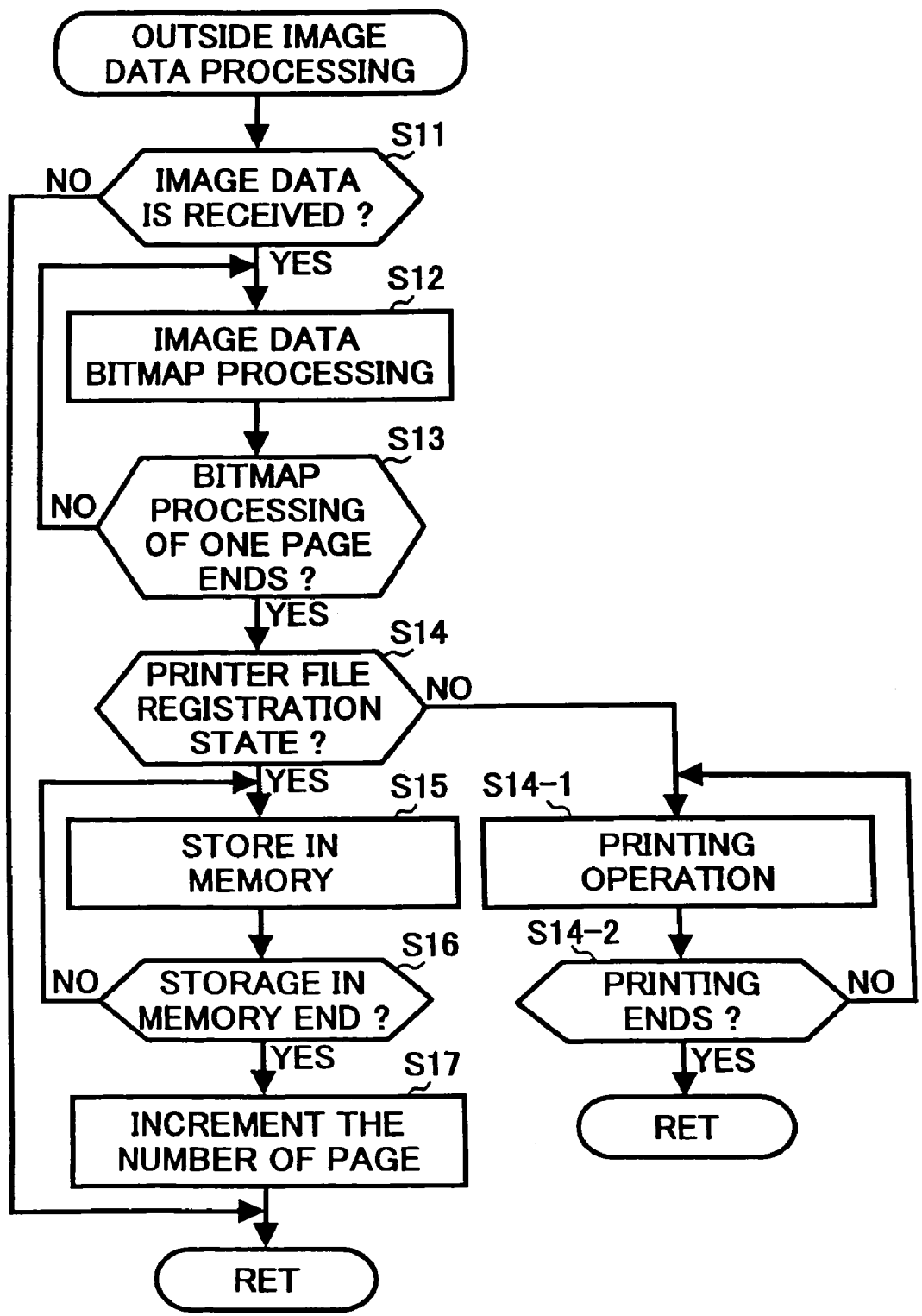
FIG. 18 is a flowchart illustrating a storing process of image data.

FIG. 18 is a flowchart illustrating an image data storing process in the printer file registration state. Whether or not image data is received is judged at S11. When the image data is received, Yes at S11, the received image data is bitmapped (i.e., an image is bitmapped so that it can be printed or stored in a memory) at S12. At S13, whether or not the process has been completed is judged. When the bitmapping process has been completed, Yes at S13, whether or not the apparatus is in a printer file registration state is judged at S14. When the apparatus is judged to be in the printer file registration state, Yes at S14, the image data is stored in a memory at S15. At S16, whether or the storage of the image data has been completed is judged. When the storage of the image data has been completed, Yes at S16, page number information is incremented at S17 in the management file where the image data is stored having a printer registration management file number. When the apparatus is not in the printer file registration state at S14, i.e. No at S14, a usual printing operation is executed at S14-1. At S14-2, whether or not the printing operation is completed is judged. According to an example of the present invention, an identical bitmap data of an image data used in a printing operation is used in a storing operation by compressing it. Thereby, a printing operation is quickly performed when printing image data stored in a memory, resulting in an enhanced printing throughput. Image data from the outside can also be stored as it is, if the printing throughput is not necessarily considered.

Figure 19:
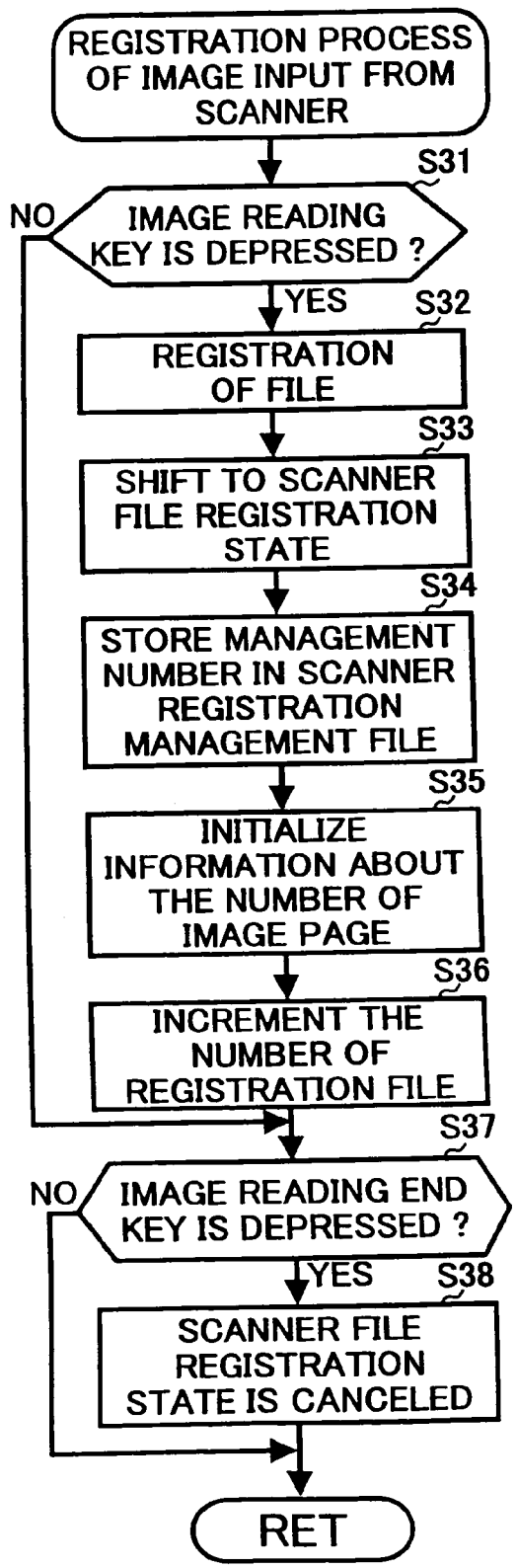
FIG. 19 is a flowchart illustrating a registrating process of an image input from a scanner.

FIG. 19 is a flowchart illustrating a registrating process of an image input from a scanner. Whether or not the reading key 46 is depressed is judged at S31. When the reading key 46 is depressed on the screen displaying each file list of stored image data (see FIG. 6), Yes at S31, a management file region is secured at S32 to store a scanner image as file management data. The apparatus then shifts to a scanner file registration state at S33. The obtained management file number at S32 is memorized as a scanner registration management file number at S34. Information about the number of image pages is initialized as file information at S35. The registration file number is then incremented at S36. Then, the display screen is switched to one for performing a storing operation of an image input from a scanner (see FIG. 8). When the end key 80 displayed on the screen is depressed at S37, i.e. Yes at S37, the scanner file registration state is canceled at S38.

Figure 20:
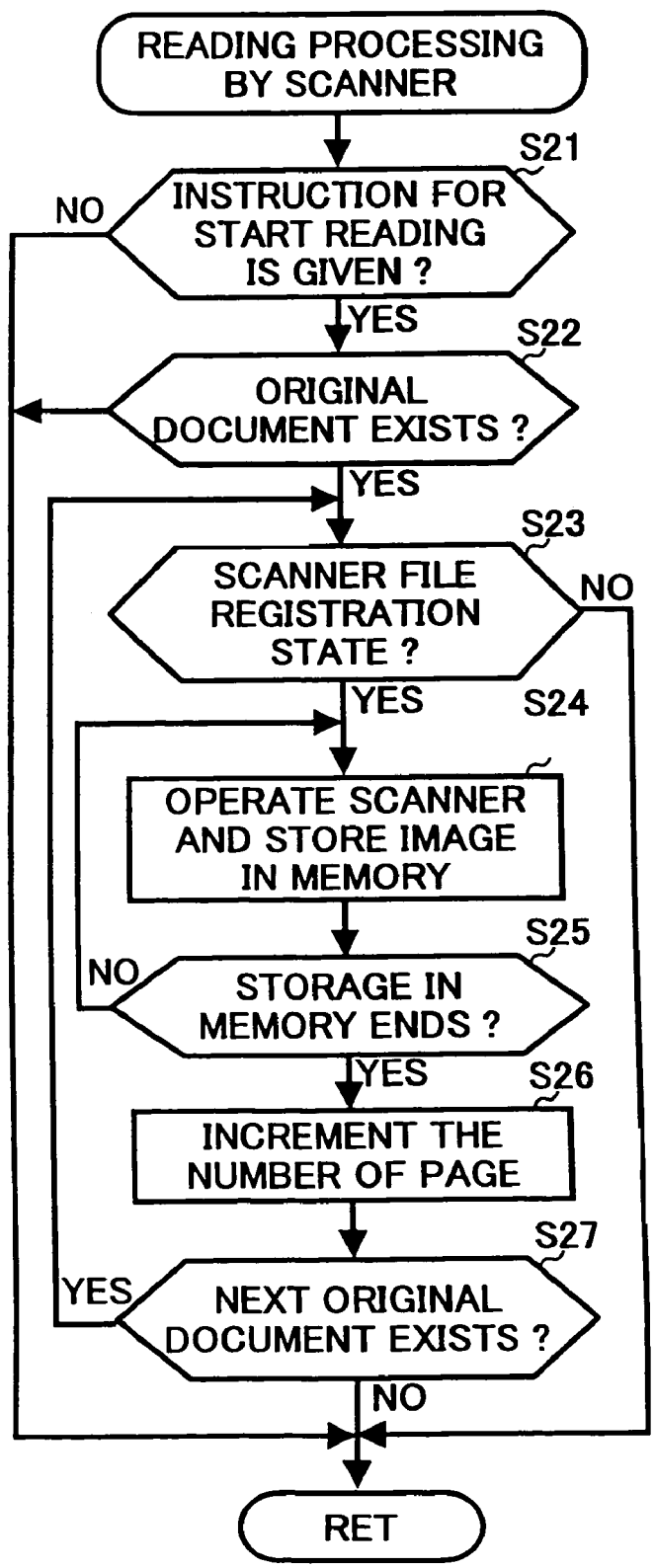
FIG. 20 is a flowchart illustrating a storing operation of image data input from the scanner.

FIG. 20 is a flowchart illustrating a storing operation of image data input from a scanner. Whether or not the start key 34 is depressed is judged at S21 as an instruction to start an image reading operation. Then, whether or not an original document exists is judged at S22. Further, whether or not the apparatus is in a scanner file registration state is judged at S23. Therefore, the scanner starts a reading operation when an image reading instruction is given, an original document to be read is set, and the apparatus is in a scanner file registration state. The image read by the scanner is stored in a memory at S24. At S25, whether or not the image has been stored is determined. When the image has been stored, Yes at S25, a page number is incremented at S26 in the management file where the image is stored having a scanner registration management file number. At S27, whether or not an additional original document exists is judged. The above-described reading and storing operations are repeated until all original documents are read.

Figure 21:
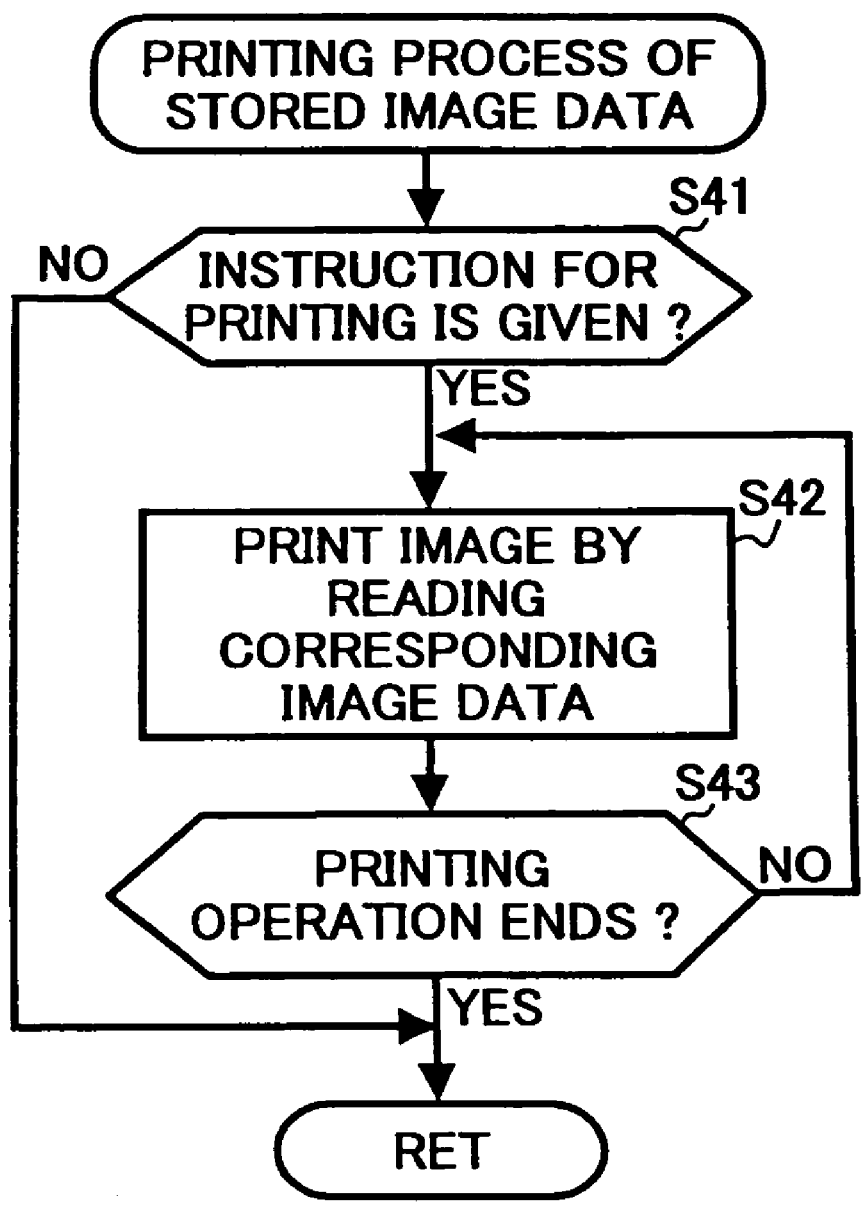
FIG. 21 is a flowchart illustrating a printing operation of image data stored in a memory.

FIG. 21 is a flowchart illustrating a printing operation of image data stored in a memory. Whether or not the start key 34 is depressed is judged at S41 as an instruction to start a printing operation. When the printing instruction is given, Yes at S41, image data is read from a memory where corresponding image data is stored. A printing operation is performed according to instructions set by printing mode setting keys at S42. Whether or not the printing operation is finished is judged at S43. The apparatus stops the operation when the instructed printing operation is finished, i.e. Yes at S43.

Figure 22:
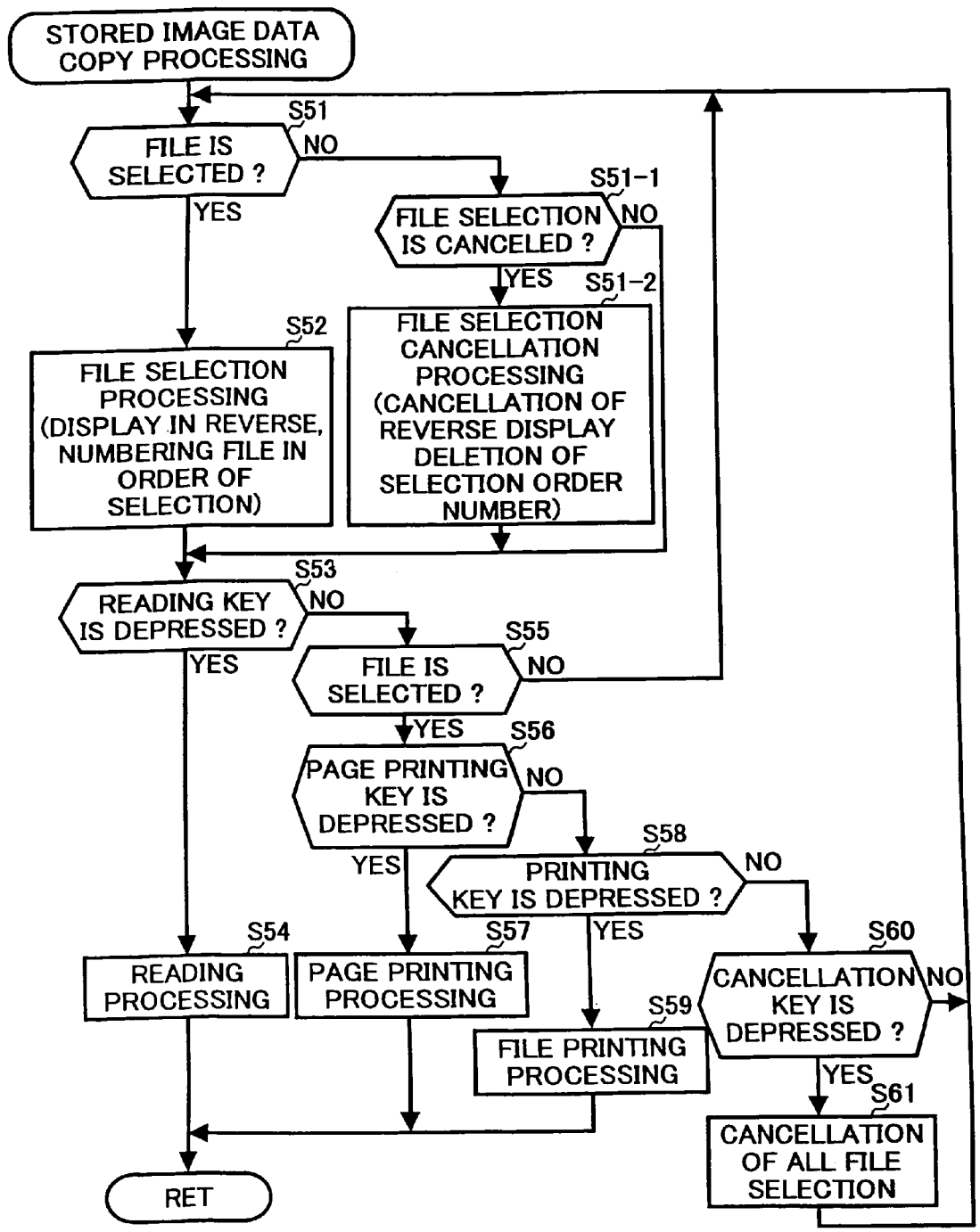
FIG. 22 is a flowchart illustrating a copying process of stored image data.
Figure 23A:
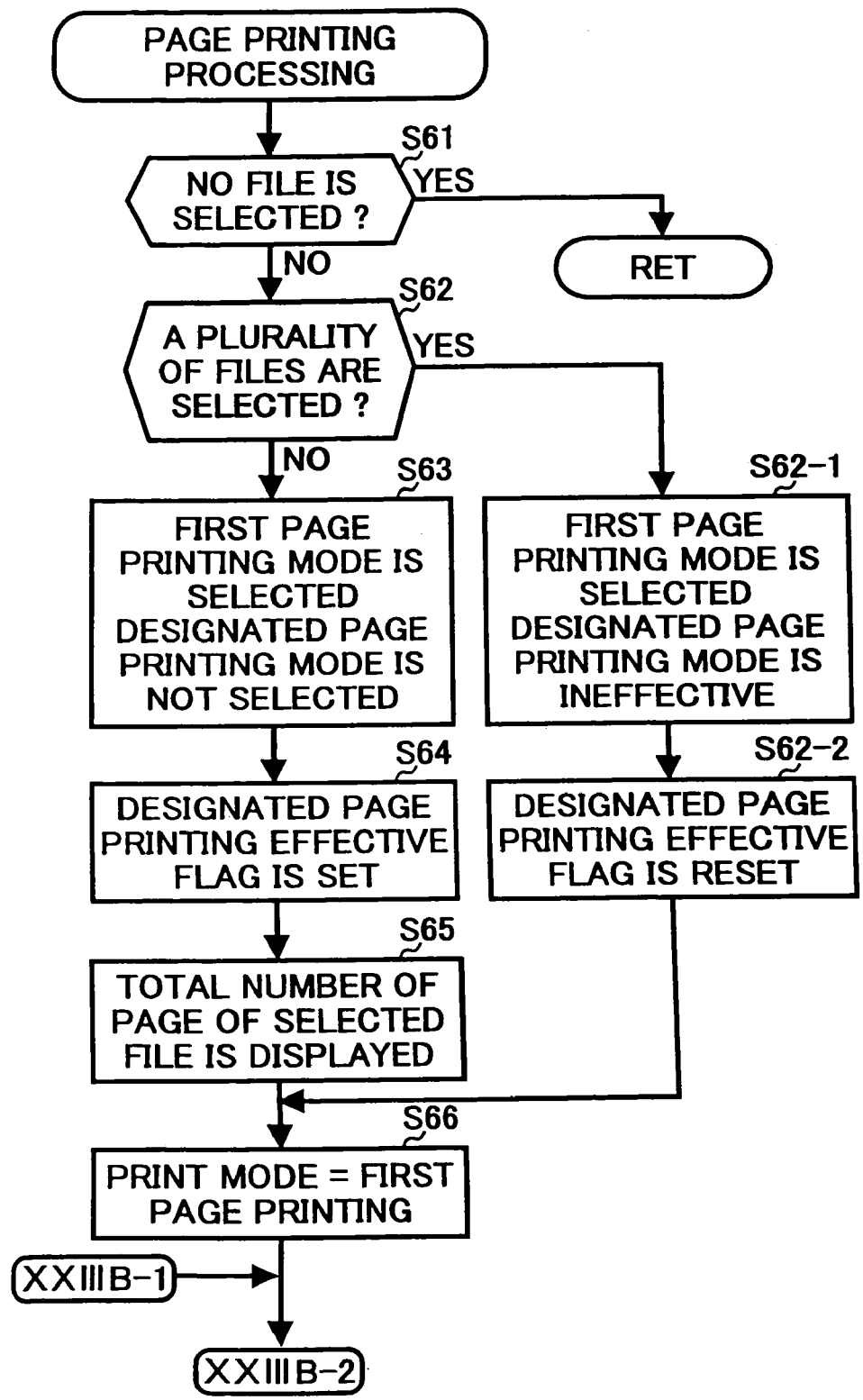
FIGS. 23A and 23B are flowcharts illustrating a page printing process.
Figure 23B:
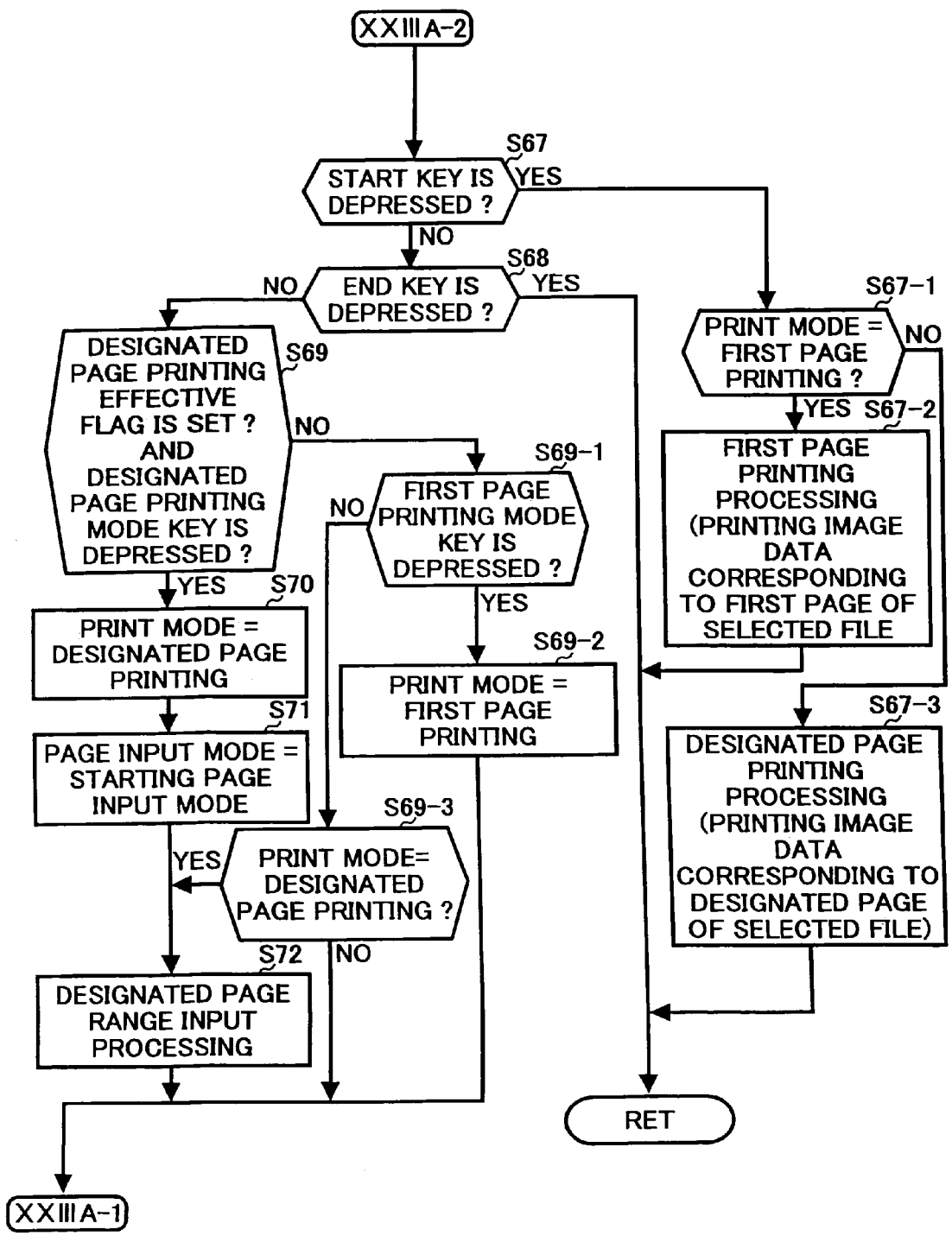
Figure 24:
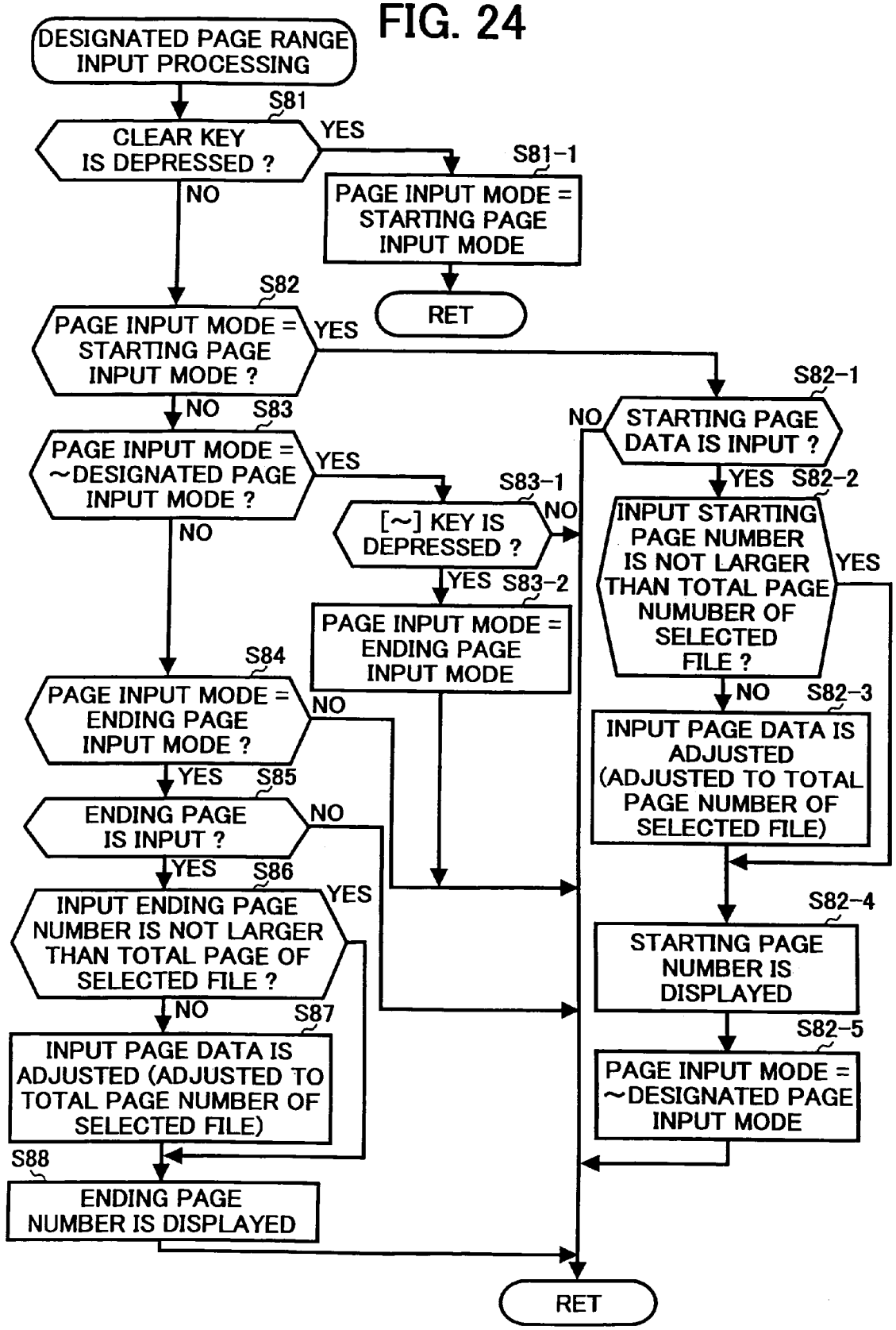
FIG. 24 is a flowchart illustrating a designated page range input process.

Referring to FIGS. 22 through 24, a detailed operation of the apparatus is now described below according to an example of the present invention. FIG. 22 is a flowchart showing a copying process of stored image data. The process is performed when the stored image data copy key 42 is depressed.

At S51, whether or not a file is selected is judged. When the file is selected, Yes at S51, a file selection process (i.e., displaying the selected file in reverse, and numbering the file in order of selection) is performed at S52. When the file is not selected, No at S51, whether or not a file selection is released is judged at S51-1. When the file selection is released, Yes at S51-1, a file selection release process (i.e., canceling the reverse display of the released file, and deleting the selection order number) is performed at S51-2. Thereafter, when the printing key 44, the page printing key 45, and the reading key 46 are depressed, each processing routine is executed.

That is, whether or not the reading key 46 is depressed is judged at S53. When the reading key 46 is depressed, Yes at S53, an image reading operation is performed at S54 and the process is finished. When the reading key 46 is not depressed, No at S53, whether or not a file is selected is judged at S55. When no file is selected, No at S55, the process returns to S51. When the file is selected, Yes at S55, whether or not the page printing key 45 is depressed is judged at S56. When the page printing key 45 is depressed, Yes at S56, a page printing process is performed at S57. The process is then finished. When the page printing key 45 is not depressed, No at S56, whether or not the printing key 44 is depressed is judged at S58. When the printing key 44 is depressed, Yes at S58, a file printing process is performed at S59. The process is then finished. When the printing key 44 is not depressed, No at S58, whether or not the cancellation key 47 is depressed is judged at S60. When the cancellation key 47 is not depressed, No at S60, the process returns to S51. When the cancellation key 47 is depressed, Yes at S60, a selection of all files is released at S61. The process then returns to S51.

When a file selection is not made, a file printing and a page printing functions are not performed. Therefore, a depression of the printing key 44 or the page printing key 45 is disregarded.

The reading processing (S54) described in FIG. 22 corresponds to the contents of FIGS. 19 and 20. The file printing processing (S59), and the page printing processing (S57) in FIG. 22 correspond to the contents of FIGS. 21 and 23, respectively. Details of FIG. 23 are described below.

FIGS. 23A, 23B are flowcharts illustrating the page printing processing (S57) described in FIG. 22. The page printing process includes: a first page printing mode and a designated printing mode. An effective or an ineffective state of each of these modes is determined by a selection of a file according to the nature of the mode. That is, whether or not each printing mode is performed is determined depending on whether a plurality of files or a single file is selected on the display screen in FIG. 6.

More specifically, when a plurality of files are selected, the operation of the designated page printing mode is prohibited. The key itself is masked to invalidate the depression of the key as shown in FIG. 10. When a single file is selected, both modes become effective. The first page printing mode is temporarily selected as a default mode (the first page printing mode is set as a prescribed mode) to reduce time and effort of an operator in inputting a printing mode. The designated page printing mode can also be set as the default mode.

As illustrated in FIGS. 9 and 11, when the designated page printing mode is effective, a total number of pages of a file is displayed below the designated page printing mode key 77 as reference information for an operator in setting a printing page range. A printing mode is set in a variable "Print Mode" by depressing a printing mode key.

When the start key 34 is depressed, a file printing process is performed according to the printing mode set in the "Print Mode". When the first page printing mode is selected, the image data corresponding to the first page of the selected file is output. When the designated page printing mode is selected, the image data corresponding to the designated page of the selected file is output. A printing process is performed on the output image data for a printing operation.

When the end key 80, shown in FIGS. 9 through 11, is depressed, the page printing mode itself ends. When the designated page printing mode key 77, shown in FIGS. 9 and 11, is depressed while the designated page printing mode is effective, the designated page printing mode is set to perform a designated page range input process. The contents of the designated page range input process is described in FIG. 24.

Referring to FIG. 23A, whether or not a file selection is made is judged at S61. When the file selection is not made, No at S61, a page printing process is not performed. Whether or not a plurality of files are selected is judged at S62. When a single file is selected, No at S62, the first page printing mode is made to be a selected state while the designated page printing mode is made to be an unselected state at S63. Further, a designated page printing effective flag is set at S64, and all page numbers of the selected file are displayed at S65. The process proceeds to S66. Contrarily, when a plurality of files are selected, Yes at S62, the first page printing mode is made to be a selected state while the designated page printing mode is made to be in an ineffective state at S62-1. The designated page printing effective flag is reset at S62-2, and the process proceeds to S66.

At S66, the print mode is set at the first page printing mode. Whether or not the start key 34 is depressed is judged at S67 (FIG. 23B). When the start key 34 is depressed, Yes at S67, whether or not the print mode is the first page printing mode is judged at S67-1. When the print mode is the first page printing mode, Yes at S67-1, a first page printing process is performed at S67-2. When the printing mode is not the first page printing mode, No at S67-1, a designated page printing process is performed at S67-3.

When the start key 34 is not depressed, No at S67, whether or not the end key 80 is depressed is judged at S68. When the end key 80 is depressed, Yes at S68, the page printing process is finished. When the end key 80 is not depressed, No at S68, whether or not the designated page printing effective flag is set and the designated page printing mode key 77 is depressed is judged at S69. When the designated page printing mode key 77 is depressed, Yes at S69, the print mode is set at the designated page printing mode at S70. A page input mode is set at a starting page input mode at S71, and a designated page range input process is performed at S72. The process then returns to S67. When the designated page printing mode key 77 is not depressed or the designated page printing effective flag is not set, No at S69, whether or not the first page printing mode key 76 is depressed is judged at S69-1. When the first page printing mode key 76 is depressed, Yes at S69-1, the print mode is set at the first page printing mode at S69-2. The process then returns to S67. When the first page printing mode key 76 is not depressed, No at S69-1, whether or not the print mode is the designated page printing mode is judged at S69-3. When the print mode is the designated page printing mode, Yes at S69-3, the process proceeds to S72. When the print mode is not the designated page printing mode, No at S69-3, the process returns to S67.

FIG. 24 is a flowchart illustrating the designated page range input processing shown in FIG. 23. According to the flowchart, a judgement is made six times at S81 through S86. Whether or not the clear key 79 is depressed is checked at S81. At S82, whether or not the page input mode is the starting page input mode is judged. Whether or not the page input mode is a [~] designated page input mode is judged at S83. At S84, whether or not the page input mode is an ending page input mode is judged. Whether or not ending page data is input is judged at S85. At S86, whether or not the input ending page data is not greater than the total number of pages of the selected file is judged.

When the clear key 79 is depressed in FIGS. 9 and 11, Yes at S81, an input state is initialized and the process returns to the starting page input process (S81-1). When the clear key 79 is not depressed, No at S81, whether or not the page input mode is the starting page input mode is judged at S82. When the page input mode is the starting page input mode, Yes at S82, whether or not starting page data is input is judged at S82-1. When no starting page data is input, No at S82-1, the process is finished. When the starting page data is input, Yes at S82-1, whether or not the starting page is not greater than a total number of pages of the selected file is judged at S82-2. When the starting page is not greater than the total number of pages of the selected file, Yes at S82-2, the input data is accepted and is displayed at S82-4. Contrarily, when the starting page exceeds the total number of pages of the selected file, No at S82-2, the starting page is adjusted to the total number of pages of the selected file at S82-3. The page input mode is made to be the [~] designated page input mode at S82-5. A warning display, which gives an indication when the range of the input data is greater than the total page number of the file, may be employed so that an operator can realize an abnormal page range setting.

When the page input mode is not the starting page input mode, No at S82, whether or not the page input mode is the [~] designated page input mode is checked at S83. When the page input mode is the [~] designated page input mode, Yes at S83, whether or not the [~] page range designating key 78 is depressed is judged at S83-1. When the [~] page range designating key 78 is not depressed, No at S83-1, the process is finished. When the [~] page range designating key 78 is depressed, Yes at S83-1, the page input mode is made to be the ending page input mode at S83-2. The process is then finished.

When the page input mode is not the [~] designated page input mode, No at S83, whether or the page input mode is the ending page input mode is judged at S84. When the page input mode is not the ending page input mode, No at S84, the process is finished. When the page input mode is the ending page input mode, Yes at S84, the process proceeds to S85.

When ending page data is not input, No at S85, the process is finished. When the ending page data is input, Yes at S85, whether or not the input data is not greater than a total number of pages of the selected file is judged at S86. When the input data is greater than a total number of pages of the selected file, No at S86, the input data is adjusted at S87. When the input data is not greater than the total number of pages of the selected file, Yes at S86, the ending page data is displayed at S88. The process is then finished.

There are two cases when a printing page range is designated for a plurality of files. That is, (1) to print the designated page range of each selected file, and (2) to combine a plurality of files and print the designated page range of the combined file. Therefore, if the designated page printing mode is made to be effective when a plurality of files are selected, an operator may be confused resulting in a production of an erroneous copy. Thus, according to the above-described example of the present invention, the designated page printing in the sample printing mode is prohibited when a plurality of files are selected (the designated page printing in the sample printing mode can be performed only when a single file is selected).

If a sample printing of a designated page range is performed even when a plurality of files are selected, contents of the files can be confirmed with reliability. For example, when a first page of each selected file does not include an image which indicates contents of the file (e.g., when the first page includes only a cover image which does not indicate the contents of the file), the contents of the file may not be sufficiently confirmed.

Then a second example of the present invention is described below. According to the second example, a designated page range printing is performed in a sample printing when a plurality of files are selected. The designation of the printing page range for the plurality of files is assumed that a designated page range of each selected file is printed as described in (1) above. Because a construction of hardware is identical to that of the above-described first example of the present invention, the control which is exercised differently from the first example will be mainly explained without describing the identical portion of the first example.

A file to be output is selected on the screen in FIG. 6 which is the same procedure as described in the first example. A plurality of files can be selected. When a file is selected and the page printing key 45 is depressed, the screen is shifted to that shown in FIG. 25. Of course, a file in which image data input by the scanner 50 is stored can be selected.

Figure 25:
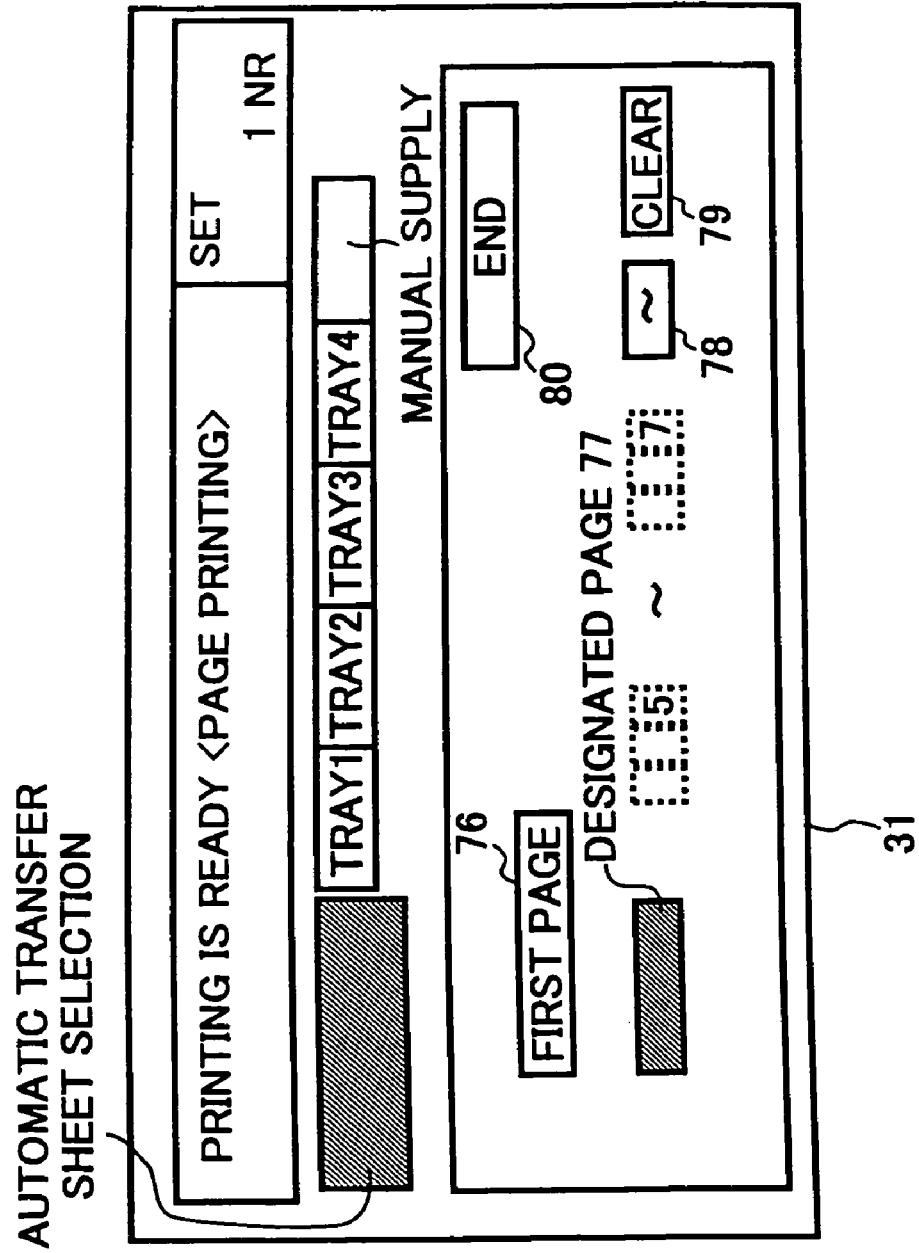
FIG. 25 shows a display screen for setting a page print output for a sample printing of an image stored in a file according to another example.

FIG. 25 shows a display screen to set a page print output for a sample printing of an image stored in a file. In a page printing mode, the first page printing mode and the designated page range printing mode can be selected. In the first page printing mode, only a first page of a designated file is printed. In the designated page range printing mode, a designated range of pages of a selected file is printed (i.e., the designated page range of each selected file is printed in order of pages). According to this example, both the first page printing mode and the designated page range printing mode are selected when a single file is selected or when a plurality of files are selected. In FIG. 25, the designated page printing mode is set and a starting page (e.g., page 5) as well as an ending page (e.g., page 7) are input as the printing page range.

The designated page printing mode key 77 is depressed to input a page, and a starting page number is input by the ten-key pad 32 (see FIG. 3). When an ending page is input, the [~] page range designating key 78 is depressed. The input mode is set at the ending page input mode. An ending page number is then input by the ten-key pad 32. When a designated page is not correctly input, the clear key 79 is depressed which puts the apparatus into a state in which the designated page printing mode key 77 is depressed. Then, a correct starting page number can be input again. When outputting a single page, the same number (e.g., 5 when page 5 is printed) is input as the starting page number and the ending page number. When the start key 34 is depressed after the starting page number alone is input (e.g., 5) without inputting the ending page number, the starting page alone (e.g., page 5) is printed.

Figure 26:
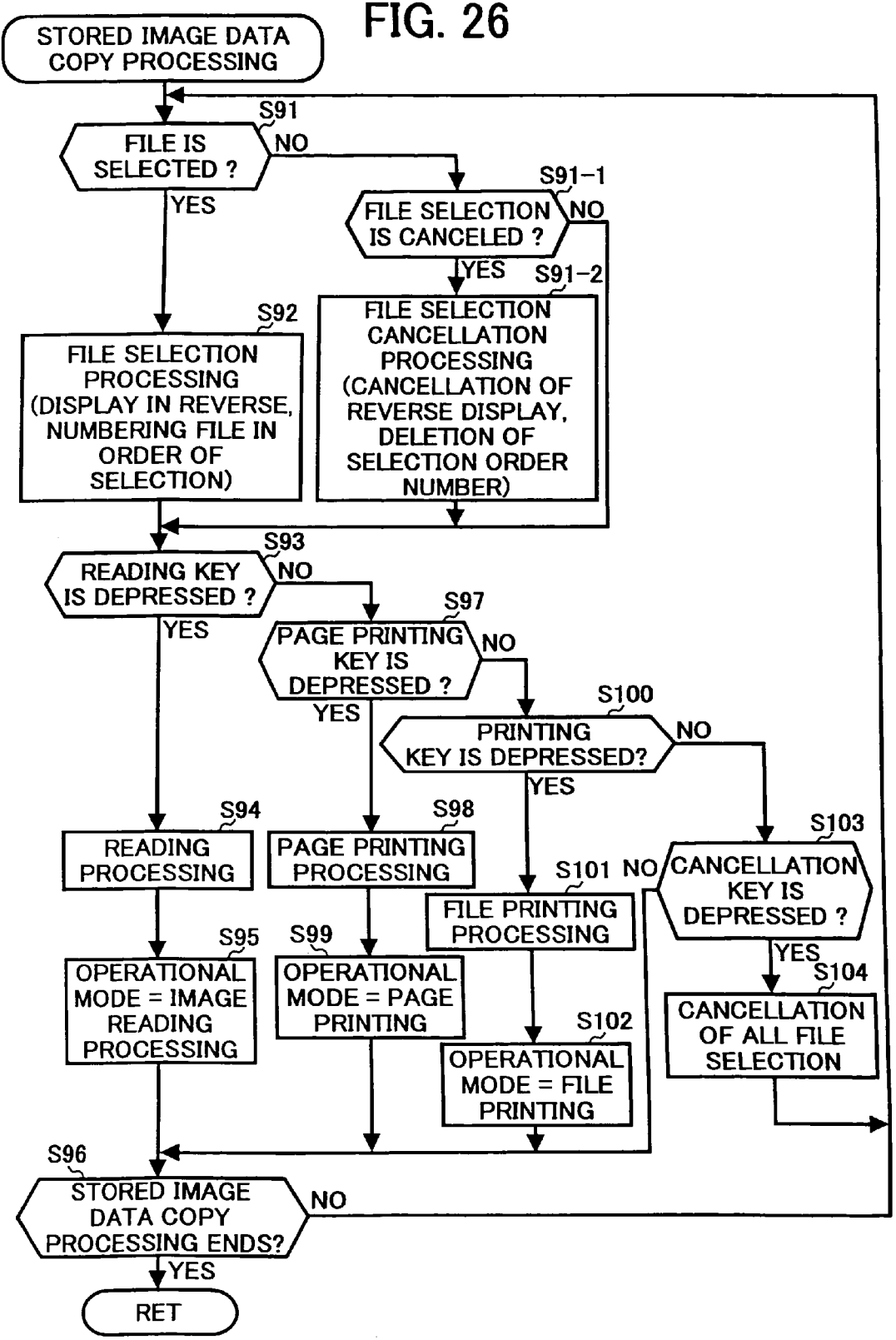
FIG. 26 is a flowchart illustrating a stored image data copy process according to another example.

FIG. 26 is a flowchart illustrating a stored image data copy process according to the second example of the present invention. The process is performed when the stored image data copy key 42 (see FIG. 3) is depressed. More particularly, a selection of a file or a cancellation of the selected file is detected. Depressions of the printing key 44, the page printing key 45, and the reading key 46 are also detected.

Whether or not a file is selected is judged at S91. When the file is selected, Yes at S91, a file selection process, including displaying the selected file in reverse and numbering the file in order of selection, is performed at S92. The process then proceeds to S93. The file selection process at S92 is described below in detail referring to FIG. 27. When a file is not selected, No at S91, whether or not a file selection is released is judged at S91-1. When the file selection is not released, No at S91-1, the process proceeds to S93. When the file selection is released, Yes at S91-1, a file selection cancellation process, including a cancellation of the reverse display and deletion of the selection order number of the selected file, is performed at S91-2. The process then proceeds to S93.

At S93, whether or not the reading key 46 (see FIG. 6) is depressed is judged. If the reading key 46 is depressed, Yes at S93, an image reading process is performed at S94. An operational mode is set at the image reading process mode at S95. The process then proceeds to S96. When the reading key 46 is not depressed, No at S93, whether or not the page printing key 45 (see FIG. 6) is depressed is judged at S97. When the page printing key 45 is depressed, Yes at S97, a page printing process is performed at S98. The operational mode is set at the page printing mode at S99. The process then proceeds to S96. When the page printing key 45 is not depressed, No at S97, whether or not the printing key 44 (see FIG. 6) is depressed is judged at S100. When the printing key 44 is depressed, Yes at S100, a file printing process is performed at S101. The operational mode is set at the file printing mode at S102. The process then proceeds to S96. When the printing key 44 is not depressed, No at S100, whether or not the cancellation key 47 (see FIG. 6) is depressed is judged at S103. When the cancellation key 47 is not depressed, No at S103, the process proceeds to S96. When the cancellation key 47 is depressed, Yes at S103, the selection of all files is cancelled at S104. Then, the process proceeds to S91. At S96, whether or not the stored image data copy mode is completed is judged. The process returns to S91 to continue the process until it judges that the stored image data copy mode has been completed.

Figure 27:
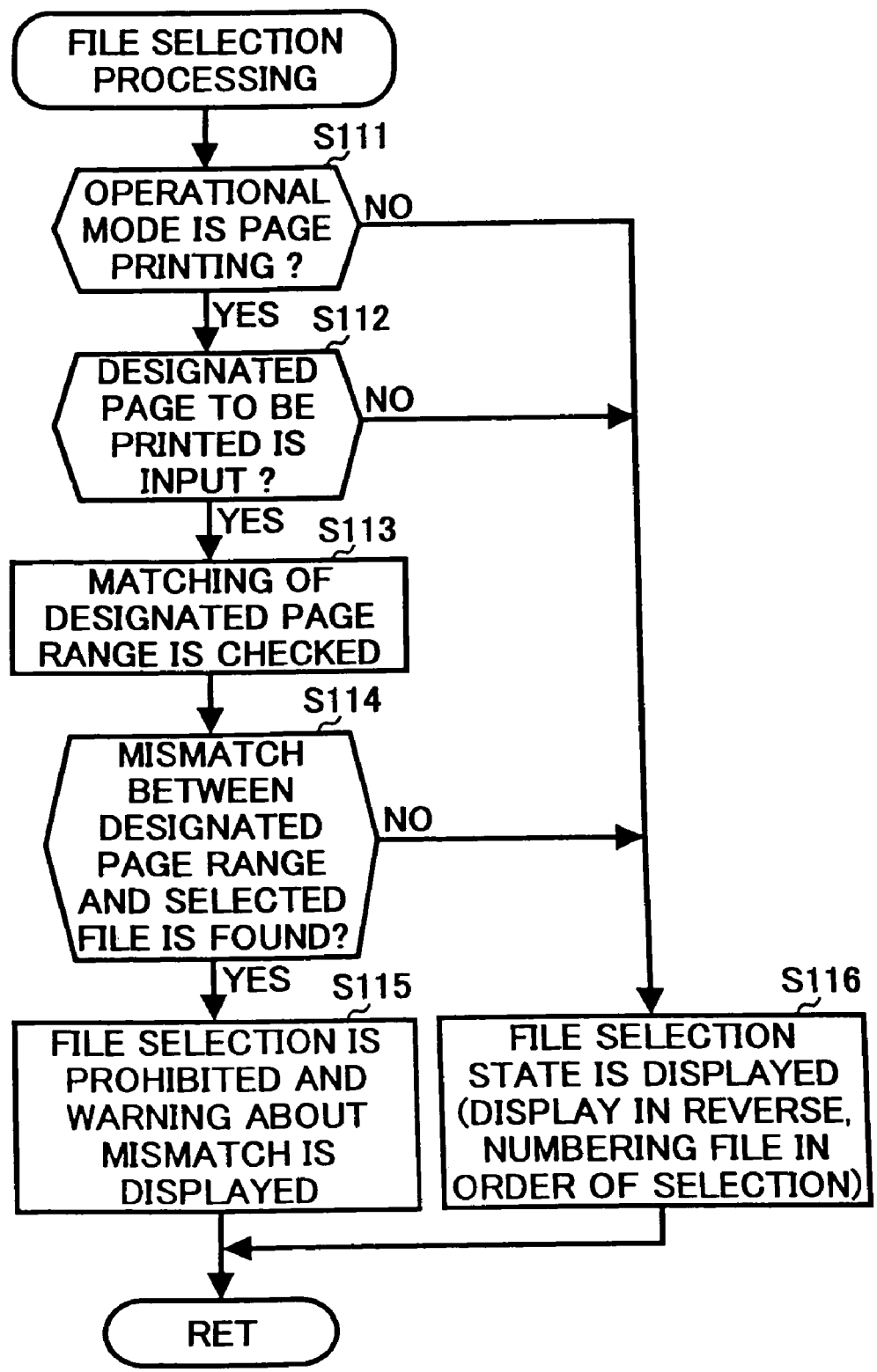
FIG. 27 is a flowchart illustrating details of a file selection process in the stored image data copy process.

FIG. 27 is a flowchart illustrating details of the file selection process at S92 in FIG. 26. In this process, a file selection is prohibited and a warning is given when a problem is found in a matching check process of a designated page range (which is described below referring to FIG. 29), because a sample printing of a designated page range of a selected file can not be performed. Of course, a file selection state is maintained when no problem is found in the above-mentioned matching check process. The matching check is made in two ways. In one way, whether or not a designated page range matches with a page range of a selected file is checked. In the other way, a designated page range is input and whether or not the designated page range matches with a page range of a selected file is checked each time a file is selected.

Whether or not the present operational mode is a page printing mode is judged at S111 in the flowchart illustrated in FIG. 27. When the operational mode is not the page printing mode, No at S111, a selection state is displayed (i.e. a selected file is displayed in reverse and the selected file is numbered in order of selection) at S116.

When the operational mode is the page printing mode, Yes at S111, whether or not a designated printing page is input is judged at S112. When the designated printing page is not input, No at S112, the process proceeds to S116. When the designated printing page is input, Yes at S112, a matching check process of the designated printing page range is performed at S113. The matching check process of the designated printing page range is described below referring to FIG. 29.

At S114, whether or not a mismatch between the designated page range and the page range of the selected file arises is judged. When the mismatch arises, Yes at S114, a selection of a file is prohibited and a warning about the mismatch is displayed at S115. When no problem in the matching is found, No at S114, the selection state of the file is displayed at S116.

With this control, the existence of a file in which a mismatch arises can be indicated to an operator when a selection of a file is made. Thus, the operator can know in advance that there is a file in which the designated page range cannot be printed, which previously prevents a production of an erroneous copy (i.e., a copy which the operator does not want is produced).

A mismatch of a designated page range may arise, for example, when pages 5 to 7 are designated as a printing page range while the total number of pages of a file is only 6 pages, i.e. page 7 is designated to be printed even though the file does not have a page 7.

Figure 28:
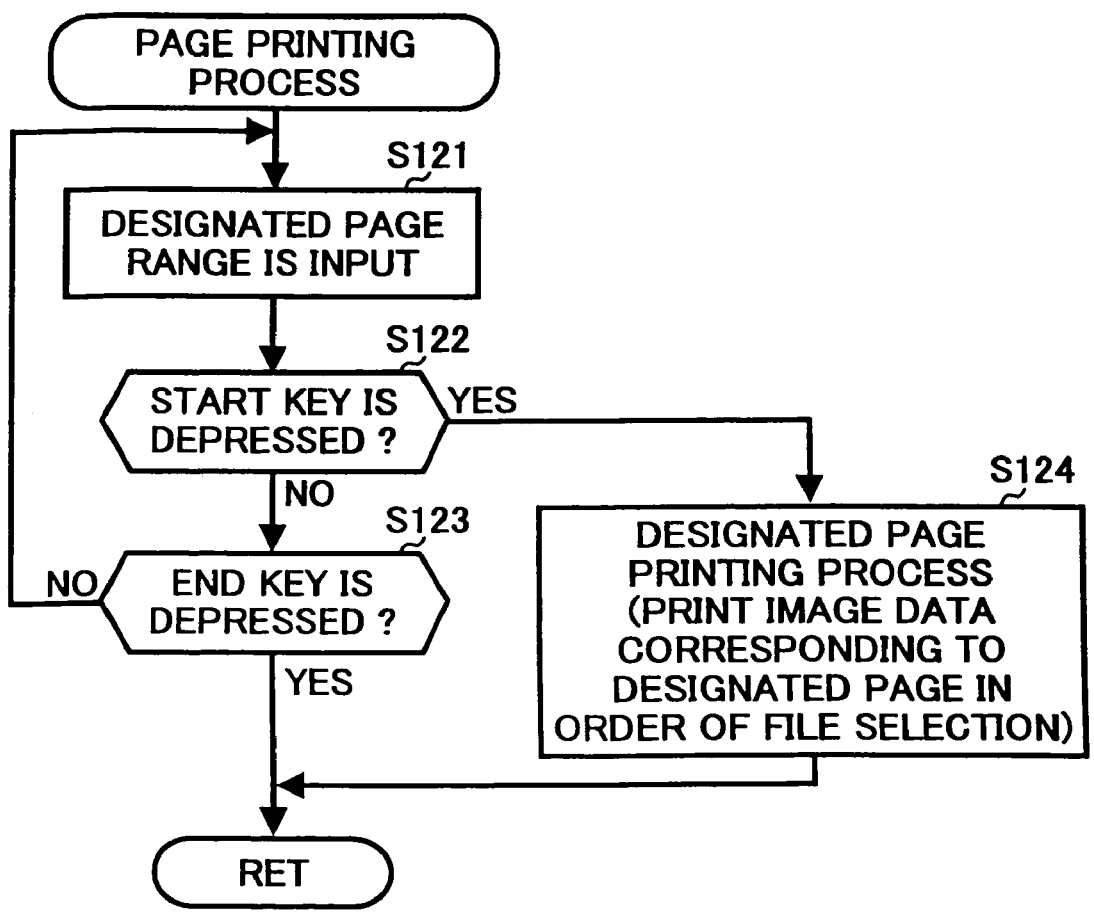
FIG. 28 is a flowchart illustrating details of the page printing process in FIG. 26.

FIG. 28 is a flowchart illustrating details of the page printing process of S98 in FIG. 26.

At S121, a designated page range input process is performed (details of the process are described referring to FIG. 30). Whether or not the start key 34 is depressed is judged at S122. When the start key 34 is depressed, Yes at S122, a designated page printing process (details of the process are described referring to FIG. 31) is performed at S124. The process then returns to the process of the flowchart illustrated in FIG. 26. When the start key 34 is not depressed, No at S122, whether or not the end key 80 is depressed is checked at S123. When the end key 80 is depressed, Yes at S123, the process returns to the process of the flowchart illustrated in FIG. 26. When the end key 80 is not depressed, No at S123, the process returns to S121.

Figure 29:
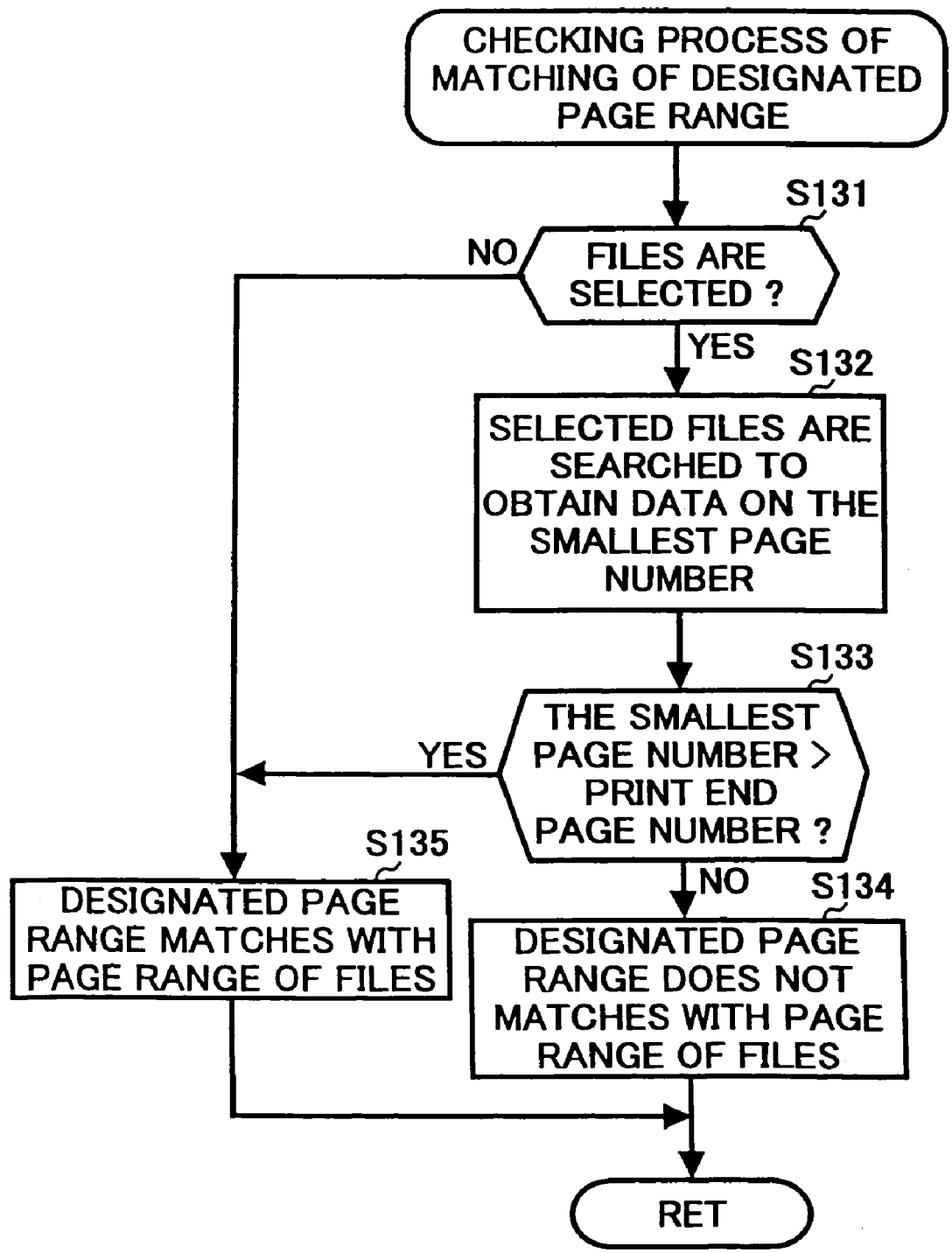
FIG. 29 is a flowchart illustrating details of a match check process of designated page range data performed in FIG. 27.

FIG. 29 is a flowchart illustrating details of the match check process of designated page range data performed at S113 in FIG. 27. In this process, a match between a page number of each selected file and an input designated page range data is examined. More specifically, whether or not the selected file is to be printed based on the input designated page range data is judged.

Whether or not files are selected is judged at S131. When files are selected, Yes at S131, the selected files are searched to obtain data on the smallest page number of a file at S132. Whether or not the smallest page number is larger than a designated print ending page number is then checked at S133. When the smallest page number is smaller than the designated print ending page number, No at S133, it is judged at S134 that a mismatch between the page number of the files and the designated printing page range arises. When the smallest page number is larger than the designated print ending page number, Yes at S133, it is judged at S135 that there is no problem in the match between the page number of the files and the designated printing page range. When no file selection is made, No at S131, the process proceeds to S135 judging that there is no problem in the match between the page number of the files and the designated printing page range.

Figure 30A:
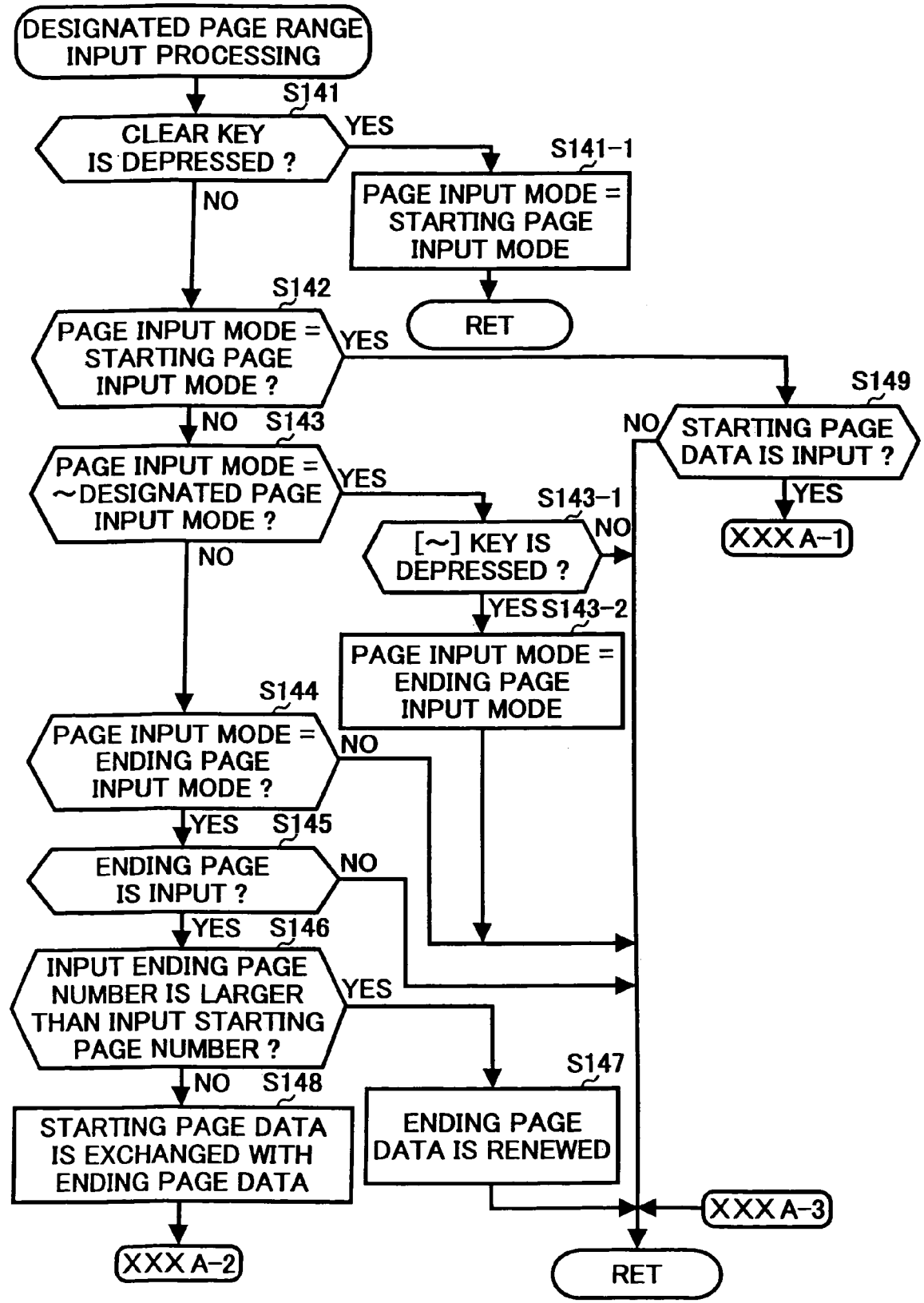
FIGS. 30A and 30B are flowcharts illustrating details of a designated page range input process performed in FIG. 28.
Figure 30B:
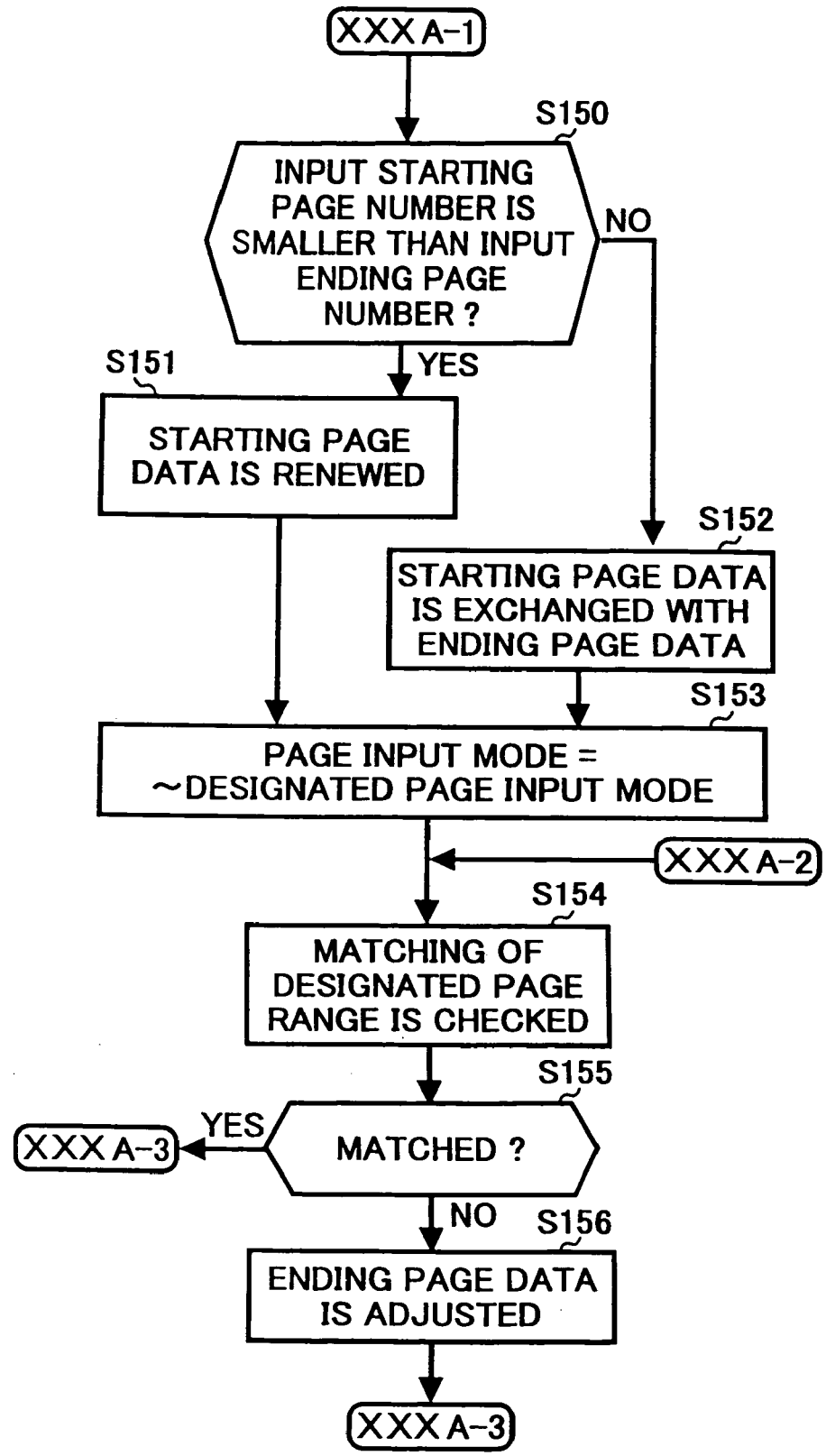

FIGS. 30A and 30B are flowcharts illustrating details of the designated page range input process performed at S121 in FIG. 28.

According to the flowcharts, a judgement is made six times at S141 through S146. Whether or not the clear key 79 is depressed is checked at S141. When the clear key 79 is depressed in FIGS. 9 and 11, Yes at S141, an input state is initialized and the process returns to the starting page input process at S141-1. When the clear key 79 is not depressed, No at S141, whether or not the page input mode is the starting page input mode is judged at S142. When the page input mode is the starting page input mode, Yes at S142, whether or not starting page data is input is judged at S149. When no starting page data is input, No at S149, the process is finished. When the starting page data is input, Yes at S149, whether or not the starting page number is smaller than an input ending page number is judged at S150 (FIG. 30B). When the starting page number is smaller than the input ending page number, Yes at S150, the starting page data is renewed at S151. When the starting page number is larger than the input ending page number, No at S150, the starting page data is exchanged with the input ending page data at S152. At S153, the page input mode is made to be the [~] designated page input mode. A match between the designated page range and the number of pages of files is checked at S154.

Whether or not a mismatch between the designated page range and the number of page of files arises is judged at S155. When there is no problem in the match, Yes at S155, the process is finished. When a problem is found in the match, No at S155, the ending page data is adjusted to the smallest page number of a file in the selected files at S156.

When the page input mode is not the starting page input mode at S142, i.e. No at S142, whether or not the page input mode is the [~] designated page input mode is checked at S143. When the page input mode is the [~] designated page input mode, Yes at S143, whether or not the [~] page range designating key 78 is depressed is judged at S143-1. When the [~] page range designating key 78 is not depressed, No at S143-1, the process is finished. When the [~] page range designating key 78 is depressed, Yes at S143-1, the page input mode is made to be the ending page input mode at S143-2. The process is then finished.

When the page input mode is not the [~] designated page input mode at S143, i.e. No at S143, whether or the page input mode is the ending page input mode is judged at S144. When the page input mode is not the ending page input mode, No at S144, the process is finished. When the page input mode is the ending page input mode, Yes at S144, the process proceeds to S145.

When no ending page data is input at S145, i.e. No at S145, the process is finished. When ending page data is input, Yes at S145, whether or not the input ending page number is larger than the starting page number is judged at S146. When the input ending page number is larger than the starting page number, Yes at S146, ending page data is renewed at S147. The process is then finished. When the input ending page number is equal to or smaller than the starting page number, No at S146, the starting page data is replaced with the ending page data at S148. The process then proceeds to S154.

Figure 31:
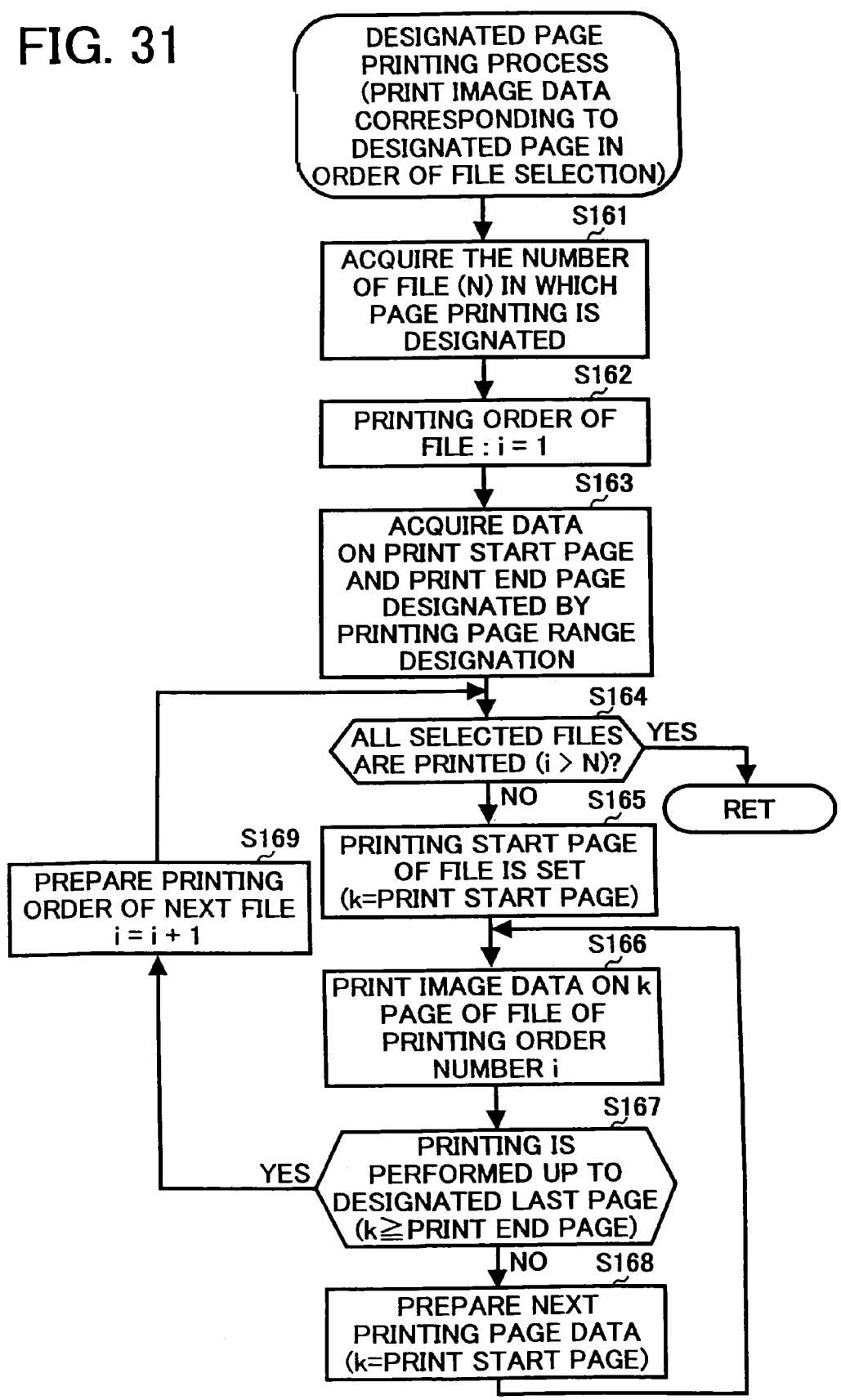
FIG. 31 is a flowchart illustrating details of a designated page range printing process performed in FIG. 28.

FIG. 31 is a flowchart illustrating the designated page range printing process performed at S124 in FIG. 28. In this process, images of a designated page range of each file are output in selection order of files. That is, a printing operation is performed by reading images from the corresponding designated pages of the files in selection order of the files.

The number of files (N) for which a page printing is designated is acquired at S161. A variable "i", which indicates a printing order of a file, is set at 1 at S162. Data on a designated printing page range is acquired at S163. The data includes a print start page and a print end page. At this time, when the print end page is not designated, the same value that is input as the print start page is set as the print end page. When the print start page is not designated, the same value that is input as the print end page is set as the print start page. When neither the print start page nor the print end page are designated, both the print start page and the print end page are set at 1. With this arrangement, the designated page printing operation is performed, when the start key 34 is depressed while either the print start page or the print end page is input. Whether or not all selected files are printed (i.e., i>N) is judged at S164. When the all selected files have been printed, 'Yes at S164, the process is finished.

When all the selected files have not been printed, No at S164, a file printing page position (k=PrintStartPage) is set at S165. Image data of "k" page of the file of the printing order number "i" is read out and printed at S166. Whether or not the designated pages are printed (k≧PrintEndPage) is judged at S167. When the designated pages are printed, Yes at S167, the above-described variable "i", which indicates a printing order of a file, is incremented at S169. When the designated pages have not been printed, No at S167, the above-described variable "k", which indicates a page number, is incremented at S168 to prepare next printing page data. The process then returns to S1166.

The flowchart in FIG. 31 can be used to perform the process of S67-3 in FIG. 23. In this case, "N" is always set at 1 at S161 in FIG. 31 because only a single file is selected when the designated page printing mode is selected according to the first example of the present invention.

By the above-described sample printing mode, images of designated pages of selected files can be visually checked (by a sample printing). Thus, contents of the files can be confirmed with accuracy. Further, a match between a designated printing page range in a sample printing mode and a page range of selected files is checked and a warning is given when a mismatch arises. Therefore, an operator does not need to judge the match between the designated printing page range in the sample printing mode and the page range of the selected files. When there are many files or when a file has a large number of pages, it is hardly possible for the operator to remember the data and judge whether or not the designating printing page range matches with the page range of the selected files. Thus, the apparatus is user-friendly. A production of an erroneous copy is also prevented which avoids unnecessary consumption of recording sheets and wasting time. Furthermore, in the sample printing mode, when a printing page range, which does not match with a page range of selected files, is designated, the designated printing page range is automatically adjusted so as to match the page range of the selected files. Hence, an appropriate sample printing is executed so that an operator can visually check contents of files to prevent a production of an erroneous copy, even when the operator erroneously inputs the designated printing page range.

Next, a third example of the present invention is described below. According to this example, when a designated printing page range input by an operator in a sample printing mode does not match with a page range of a selected file, only an image which can be output is output as the sample print. Because a construction of hardware is identical to those of the above-described examples, the control which is exercised differently from those examples will be mainly explained without describing the identical portion of the previous examples.

A file to be output is selected on the screen in FIG. 6 which is the same procedure as described in the above-described examples. A plurality of files can be selected. When a file is selected and the page printing key 45 is depressed, the screen is shifted to that shown in FIG. 25. Of course, a file in which image data input by the scanner 50 is stored can be selected as in the above-described examples.

According to the third example of the present invention, a stored image data copy process is identical to that described referring to FIG. 26, except for the contents of the designated page range input process (S121 in FIG. 28) performed in the page printing process (S98, details of the process are described referring to FIG. 28) of the flowchart illustrated in FIG. 26 and the designated page printing process (S124 in FIG. 28). The designated page range input process and the designated page printing process according to the third example of the present invention are described below referring to FIGS. 32 and 33, respectively.

Figure 32A:
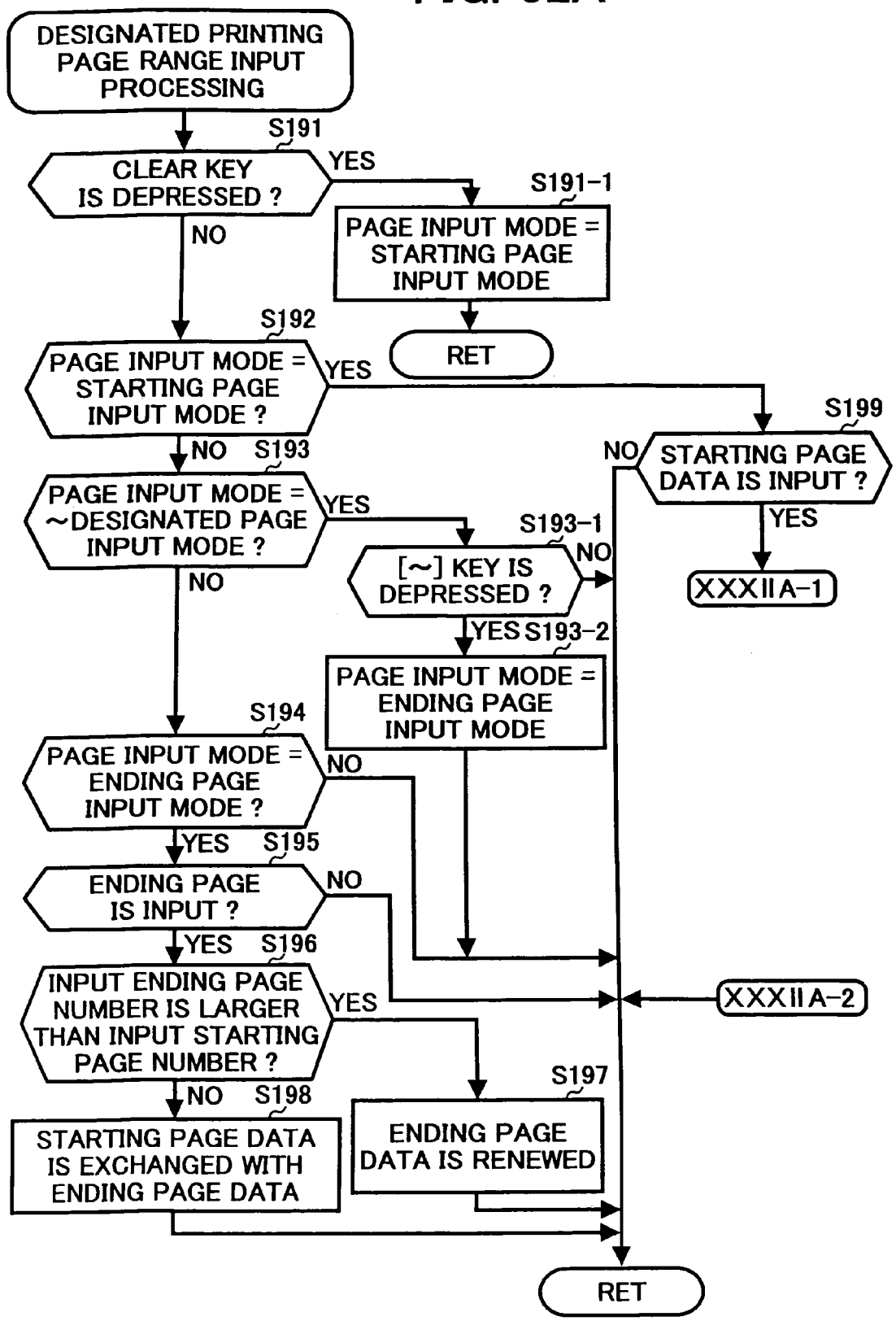
FIGS. 32A and 32B are flowcharts illustrating details of the designated page range input process according to another example.
Figure 32B:
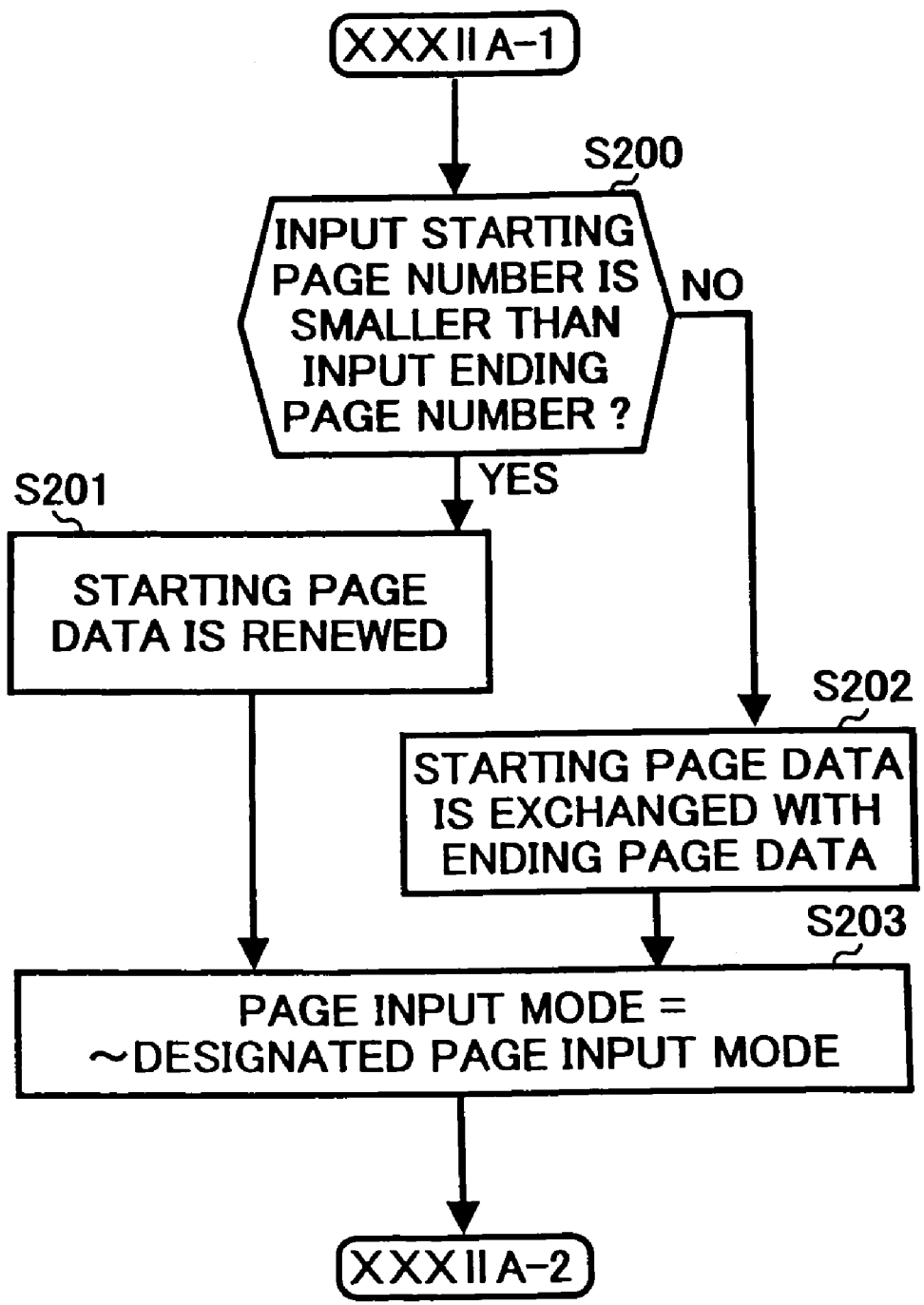

FIGS. 32A, 32B are flowcharts illustrating details of the designated page range input process in the page printing process of the stored image data copy process.

According to the flowcharts, a judgement is made six times at S191 through S196. Whether or not the clear key 79 is depressed is checked at S191. At S192, whether or not the page input mode is the starting page input mode is judged. Whether or not the page input mode is the [~] designated page input mode is judged at S193. At S194, whether or not the page input mode is the ending page input mode is judged. Whether or not the ending page data is input is judged at S195. At S196, whether or not the input ending page number is larger than an input starting page number is judged. When it is judged that the clear key 79 is depressed in FIGS. 9 and 11, Yes at S191, an input state is initialized and the process returns to the starting page input process at S191-1.

When the clear key 79 is not depressed, No at S191, whether or not the page input mode is the starting page input mode is judged at S192. When the page input mode is the starting page input mode, Yes at S192, whether or not starting page data is input is judged at S199. When no starting page data is input, No at S199, the process is finished. When the starting page data is input, Yes at S199, whether or not the starting page number is not larger than an input ending page number is judged at S200 (FIG. 32B). When the starting page number is smaller than the input ending page number, Yes at S200, the starting page data is renewed at S201. When the starting page number is larger than the input ending page number, No at S200, the starting page data is exchanged with the input ending page data at S202. At S203, the page input mode is made to be the [~] designated page input mode. The process is then finished.

When the page input mode is not the starting page input mode at S192, i.e. No at S192, whether or not the page input mode is the [~] designated page input mode is checked at S193. When the page input mode is the [~] designated page input mode, Yes at S193, whether or not the [~] page range designating key 78 is depressed is judged at S193-1. When the [~] page range designating key 78 is not depressed, No at S193-1, the process is finished. When the [~] page range designating key 78 is depressed, Yes at S193-1, the page input mode is made to be the ending page input mode at S193-2. The process is then finished.

When the page input mode is not the [~] designated page input mode at S193, i.e. No at S193, whether or the page input mode is the ending page input mode is judged at S194. When the page input mode is not the ending page input mode, No at S194, the process is finished. When the page input mode is the ending page input mode, Yes at S194, the process proceeds to S195.

When no ending page data is input, No at S195, the process is finished. When ending page data is input, Yes at S195, whether or not the input ending page number is larger than the starting page number is judged at S196. When the input ending page number is larger than the starting page number, Yes at S196, ending page data is renewed at S197. The process is then finished. When the input ending page number is equal to or smaller than the starting page number, No at S196, the starting page data is replaced with the ending page data at S198. The process is then finished.

Figure 33A:
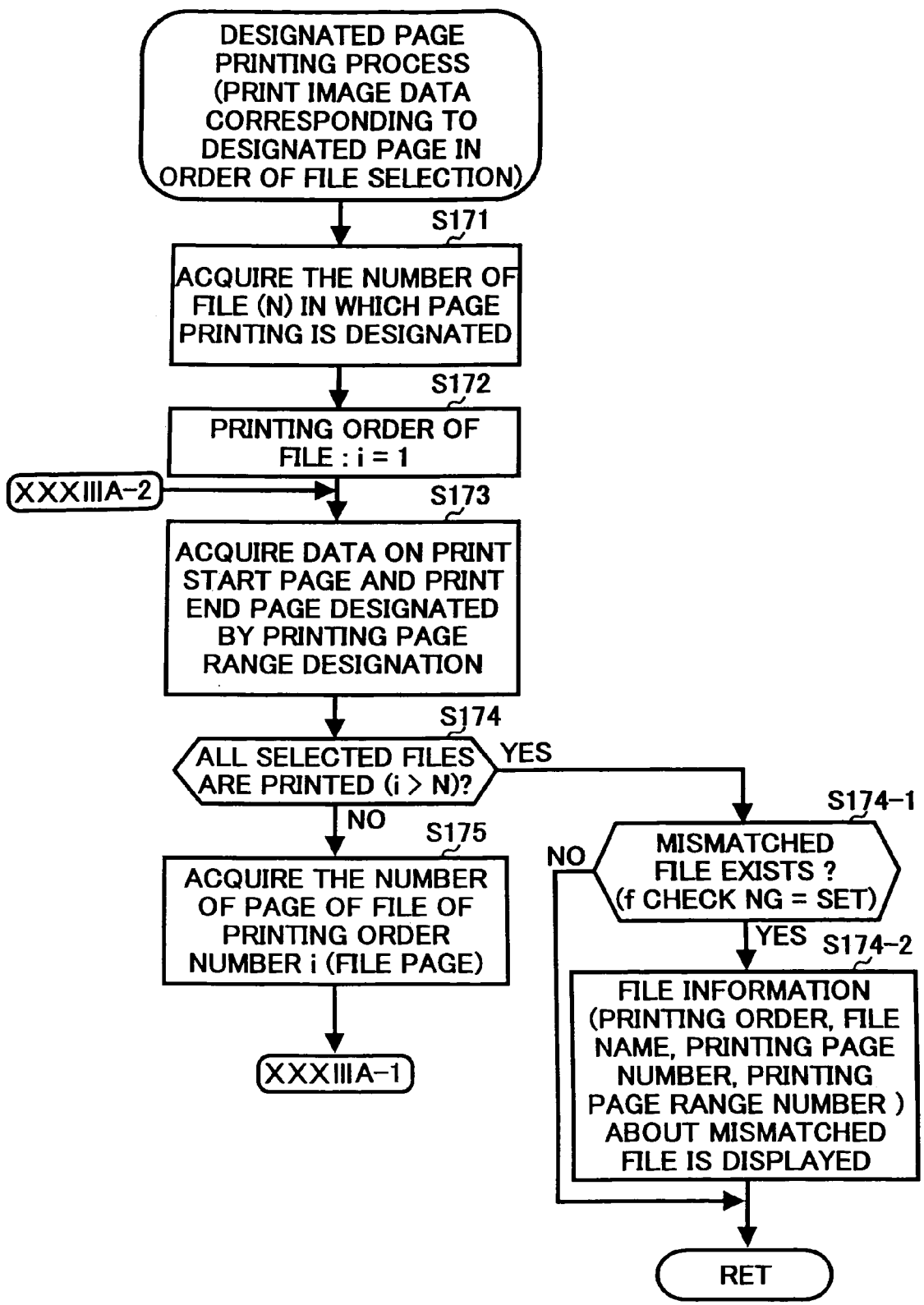
FIGS. 33A and 33B are flowcharts illustrating details the designated page printing process according to another example.

FIGS. 33A, 22B are flowcharts illustrating details of the designated page printing process in the page printing process of the stored image data copy process. In this process, a match between a page number of each selected file and an input designated page range data is examined. When the number of pages of a file of the printing order number "i" (FilePage) is larger than an ending page (PrintEndPage) of a designated printing page range (i.e., FilePage<PrintEndPage, for example, the designated ending page is 5 while the number of pages of the file is 3), a mismatch between the designated page and the file page data arises. Then, the designated page printing process of the file, in which a mismatch is found, is performed by temporarily adjusting the printing ending page (PrintEndPage) to the number of pages of the file (FilePage), i.e. making PrintEndPage=FilePage.

In this case, because an output of the designated page range of the file is not guaranteed, file information (selected order of the file, file name, and so forth) and the number of pages printed are memorized. The information is used to give a warning about an occurrence of a mismatch when all the selected files are printed. The above-described match is checked for each selected file, and then a designated page printing operation is performed for all selected files.

The number of files (N) for which a page printing is designated is acquired at S171. A variable "i", which indicates a printing order of a file, is set at 1 at S172. Data on a designated printing page range is acquired at S173. The data includes the print starting page (PrintStartPage) and the print ending page (PrintEndPage). Whether or not all selected files are printed (i.e., i>N) is judged at S174. When the all selected files have been printed, Yes at S174, the process proceeds to S174-1. At S174-1, whether or not there is a file in which a mismatch problem arises is judged. When no mismatch problem is found in a selected file, No at S174-1, the process is finished. When a file in which the mismatch problem arises is found, Yes at S174-1, information on the file is memorized, and displayed at S174-2. The process is then finished.

Figure 33B:
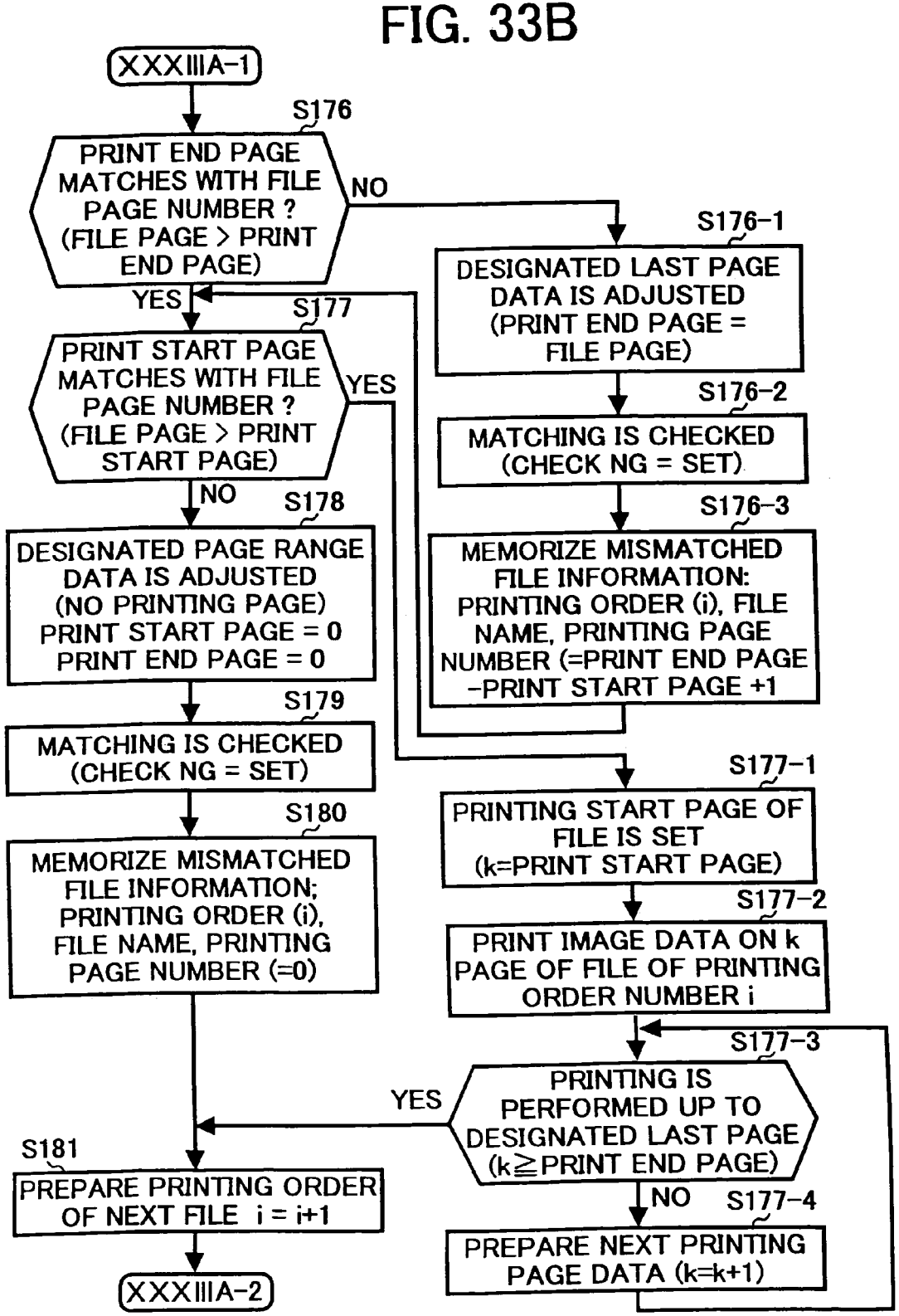

When all the selected files have not been printed at S174, i.e. No at S174, page number data (FilePage) of a file of print order number "i" is acquired at S175. Whether or not the page number of the file (FilePage) is larger than the print ending page (PrintEndPage) of the designated printing page range (i.e., FilePage>PrintEndPage) is checked at S176 (FIG. 33B). When the page number of the file (FilePage) is larger than the print ending page number (PrintEndPage), Yes at S176, the process proceeds to S177. When the page number of the file (FilePage) is not larger than the print ending page number (PrintEndPage), No at S176, the process proceeds to S176-1, i.e. when the match problem arises, the process proceeds to S176-1. The print ending page number (PrintEndPage) is adjusted to the page number of the file (FilePage) for the file in which the match problem arises at S176-1, making the PrintEndPage equal to the FilePage. A flag (CheckNG) indicating the problem in the match is set at S1176-2. The file information, including the printing order, the file name, and the number of printing page (=PrintEndPage−PrintStartPage+1) is memorized at S176-3. The process then proceeds to S177.

At S177, the match between the designated starting page and the number of pages of the file is checked. That is, whether or not the FilePage is larger than the PrintStartPage (i.e., FilePage>PrintStartPage) is judged. When the FilePage is larger than the PrintStartPage, Yes at S177, the file print page position (k=PrintStartPage) is set at S177-1. Image data of "k" page(s) of the file of the printing order number "i" is (are) read out and printed at S177-2. Whether or not the designated pages have been printed (k≧PrintEndPage) is judged at S177-3. The above-described variable "i", which indicates a printing order of files, is incremented at S177-4, if No in S177-3, to prepare next printing page data. The process returns to S177-3. When all designated pages have been printed, the process proceeds to S181 from S177-3.

When the FilePage is not larger than the PrintStartPage at S177, i.e. No at S177, the designated page range data is adjusted at S178. This adjustment makes both the PrintStartPage and the PrintEndPage to zero (i.e., PrintStartPage=0, PrintEndPage=0) such that no page is printed. The flag (CheckNG) indicating the problem in the match is set at S179. The file information, including the printing order, the file name, and the number of printing page (=PrintEndPage−PrintStartPage+1) is memorized at S180. The above-described variable "i" is incremented to prepare the next file printing order at S181. The process then returns to S173.

As described above, in the designated page range printing mode of the sample printing, an appropriate output is not guaranteed when a mismatch between the number of pages of a selected file and input printing page range data arises. Therefore, it is necessary to inform an operator that a desired output (i.e., selected file number×designated page number) is not obtained. Thus, according to the example of the present invention, a result of a check on the match of each file is memorized. An operator is notified of the result whenever a mismatch arises. With this arrangement, the operator can recognize that a sample print has not been performed according to an instruction of the operator. The operator can examine contents of a file by the output images, which prevents the operator from making a mistake in identifying the contents of the file.

Information about the printed page number or printed page range may be displayed after a sample printing is completed so that the operator is notified of an improper output. An example of the display is described in FIG. 34. According to the example, information about a plurality of selected files for which a sample printing is performed is displayed. The information includes a printing order, a file name, a designated page range (printing page range in FIG. 34) of each file, the printing page number (the number of pages of the designated page range), and a total page number of each file. Above the above-described information, a warning, such as "Designated page range mismatches with file page number. Caution should be exercised when confirming resultant print" is displayed.

According to the example of the present invention, when a designated page range printing mode in a sample printing is performed, only images that can be output are printed in a case in which an operator erroneously designates a printing page range (i.e., a mismatch between the designated page range and the number of pages of selected files arises). Therefore, the operator does not need to check by himself/herself whether or not the designated page range matches with the number of pages of the files designated to be sample printed, which increases an operability of the apparatus. Further, the operator can visually check the contents of files based on the output images, and production of an erroneous copy is prevented. When a problem in a match between a designated page range and the number of pages of selected files is found, information about each file for which a sample printing operation is performed is displayed. Thus, the operator can easily recognize the existing problem.

It is possible to download a program for executing the above-described controls to the digital copying machine 200 shown in FIG. 1 from the host machine 300 via a LAN or a parallel interface. By writing the downloaded program over a program stored in the ROM 69 (see FIG. 13) of the main controller 20, the digital copying machine 200 can have the functions of the present invention. The program for performing the above-described controls can be stored in an IC card or a CD-ROM. The stored program is read via the I/O port 67 (see FIG. 13) using an IC card reader or a CD-ROM driver from the IC card or the CD-ROM. The read out program is written over the stored program in the ROM 69 of the main controller 20. Thus, the digital copying machine 200 can have the functions of the present invention. Whichever method is chosen, the ROM 69 is configured to be an element, such as a flash memory in which an erasure and a rewrite of contents are electrically performed.

Obviously, numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2000-150260, filed on May 22, 2000, Japanese Patent Application No. 2001-74748, filed on Mar. 15, 2001, and Japanese Patent Application No. 2001-129511, filed on Apr. 26, 2001, and the entire contents of each of which are hereby incorporated herein by reference.

What is claimed as new and is desired to be secured by letters patent of the United States is:

1. An image forming apparatus, comprising:
a storage device configured to store input image information;
a printer configured to print the image information stored in said storage device on a recording medium;
a management data storage device configured to handle a cluster of the image information stored in said storage device as a file and to store image management data and file management data of the image information;
a file selector configured to select a plurality of files to be printed;
a printing mode selector configured to select between (1) a representative page printing mode in which an arbitrary page is designated and image information of the designated page of each of the plurality of files selected by said file selector is printed and (2) a sample printing mode in which a starting page and an ending page are designated and the information of the designated range of pages of each of the plurality of files selected by said file selector is printed;
a page range designating device configured to designate a range of pages to be printed according to the page designated in the selected printing mode; and
a controller configured to read image information of a page range designated by said page range designating device in each of the plurality of files selected by said file selector out of image information stored in said storage device based on the management data stored in said management data storage device and to print the read image information by said printer, when a print start instruction is provided with the printing mode selected by said printing mode selector and the page range is designated by said page range designating device.

2. The image forming apparatus according to claim 1, wherein said controller is further configured to control to print an image of the designated range of pages of each of the plurality of files selected by said file selector when the print start instruction is provided by designating one of a starting page and an ending page of the page range using said page range designating device when the sample printing mode is selected.

3. The image forming apparatus according to claim 1, wherein the sample printing mode comprises:
a first page printing mode configured to print a first page of each of the plurality of files to be printed; and
a designated page printing mode configured to print a designated page range of each of the plurality of files to be printed in order of pages.

4. The image forming apparatus according to claim 3, wherein said controller is further configured to display a total number of pages of each of the plurality of files selected by said file selector on a display device of the image forming apparatus when the designated page printing mode is selected in the sample printing mode.

5. The image forming apparatus according to claim 3, wherein said controller is further configured to allow performance of the first page printing mode and the designated page printing mode, when the plurality of files are selected by said file selector and when the sample printing mode is selected by said printing mode selector.

6. The image forming apparatus according to claim 3, wherein the sample printing mode is regulated by one of the first page printing mode and the designated page printing mode.

7. A method for controlling an image forming apparatus having a sample printing mode in which image information of a range of pages of a plurality of selected files is printed, the range of pages being designated by specifying a starting page and an ending page, comprising:
reading only image information of a first page of the plurality of selected files out of stored image information and printing the read image information when an instruction to print the first page of the plurality of selected files is provided in the sample printing mode; and
reading image information of a designated page range of the plurality of selected files out of stored image information and printing the read image information when an instruction to print the designated page range of the plurality of selected files is provided in the sample printing mode when the designate page range is specified by designating the starting page and the ending page.

8. The method according to claim 7, further comprising:
printing an image of the designated range of pages of each of the plurality of selected files when one of the starting page and the ending page is provided to designate the page range.

9. The method according to claim 7, further comprising:
setting one of (1) a control in which the image information of the first page of each of the plurality of selected files is read and printed and (2) a control in which the image information of the designated page range of each of the plurality of selected files is read and printed as a regulating mode of the sample printing mode.

10. A computer readable medium storing a program for controlling an image forming apparatus, the program comprising:
a first computer code for judging whether or not a plurality of files to be printed is selected;
a second computer code for selecting a representative page printing mode in which an arbitrary page is designated and the image information of the designated page of each of the plurality of selected files is printed or a sample printing mode in which a starting page and an ending page are designated and the image information of the designated range of pages of each of the plurality of selected files is printed, when the plurality of files is selected;
a third computer code for selecting a first page printing mode to print a first page of each of the plurality of selected files or a designated page printing mode to print a designated page range of each of the plurality of selected files in order of page, when the sample printing mode is selected;

a fourth computer code for designating a page range according to the page designated when the designated page printing mode is selected; and a fifth computer code for reading and printing image information of the designated page range of each of the plurality of selected files when an instruction to print is provided with the page range designated.

11. The computer readable medium according to claim 10, the program further comprising:

a sixth computer code for reading and printing only image information of the designated page of each of the plurality of selected files when a print start instruction is provided with designating one of a starting page and an ending page of the designated page range by the fourth computer code.

12. The computer readable medium according to claim 10, the program further comprising:

a sixth computer code for setting the sample printing mode to be regulated either by the first page printing mode or by the designated page printing mode without necessitating the operation performed by the third computer code for selecting the first page printing mode to print a first page of each of the plurality of selected files or the designated page printing mode to print a designated page range of each, of the plurality of selected files in order of page when the sample printing mode is selected.

* * * * *